March 30, 1943.  A. L. RICHE  2,315,223
WATER SOFTENER
Filed March 21, 1938  9 Sheets-Sheet 1

Inventor:
Arthur L. Riche
By McCanna, Wintercorn & Morsbach
Attys.

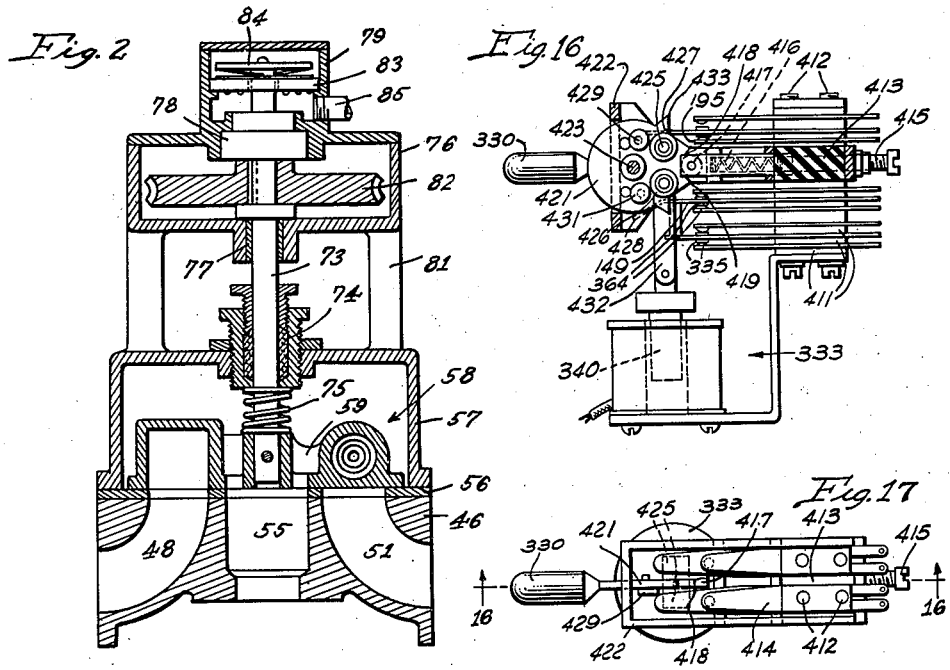
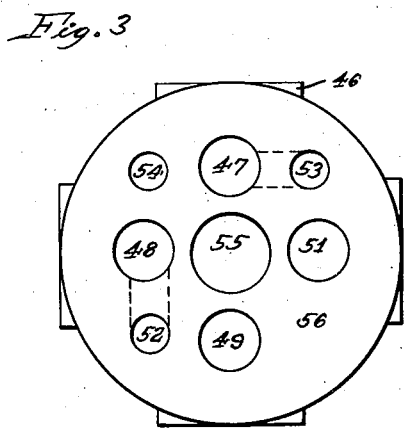
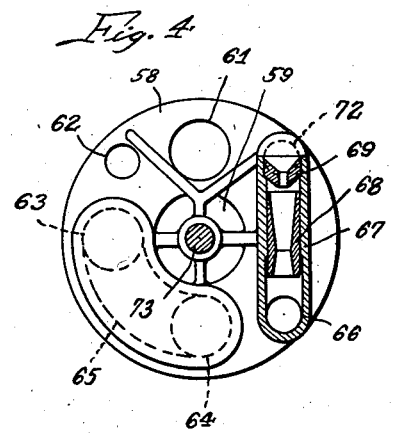

March 30, 1943. A. L. RICHE 2,315,223
WATER SOFTENER
Filed March 21, 1938 9 Sheets-Sheet 3

Inventor:
Arthur L. Riche
By McCanna, Wintercorn & Morsbach
Attys.

March 30, 1943.    A. L. RICHE    2,315,223
WATER SOFTENER
Filed March 21, 1938    9 Sheets-Sheet 4
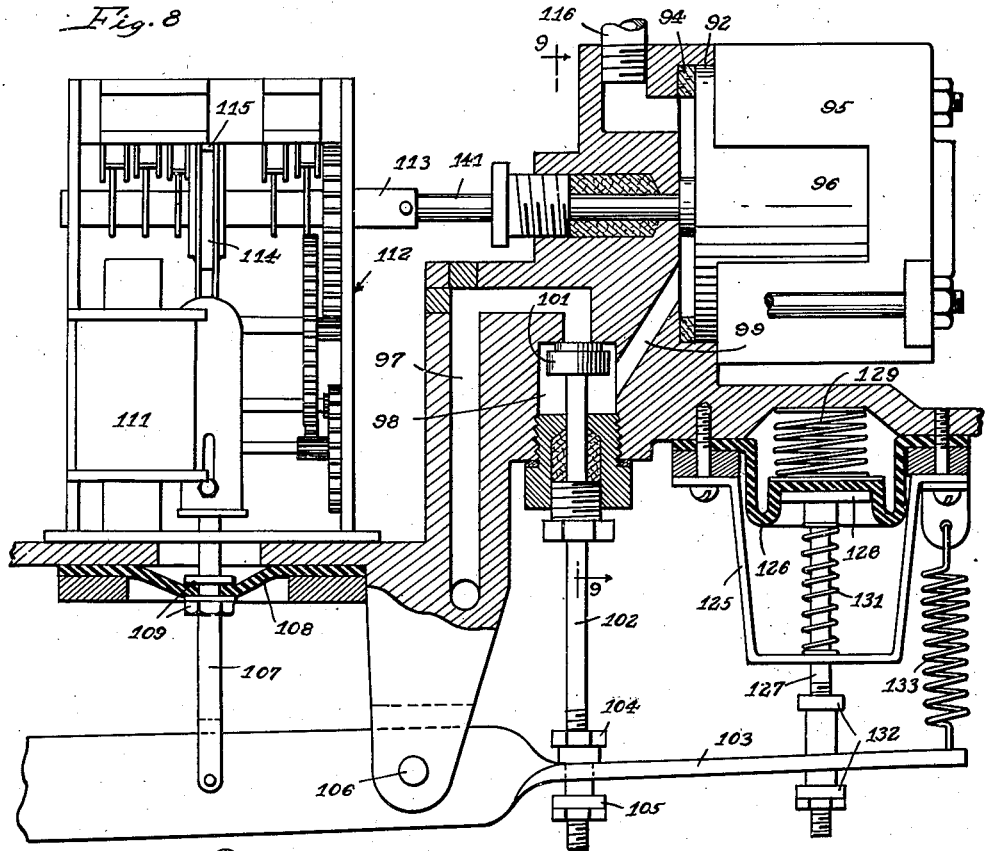
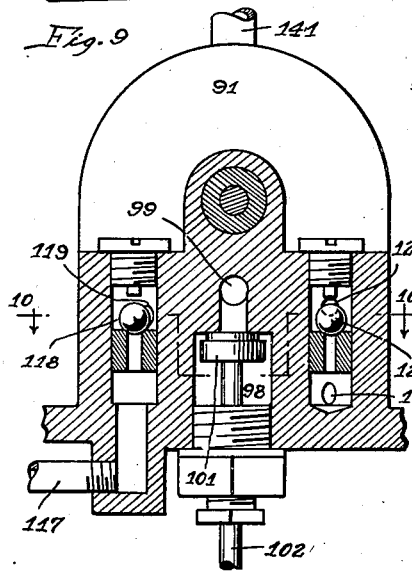
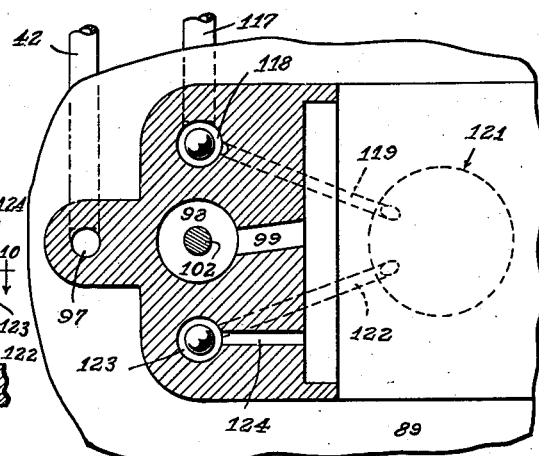
Inventor:
Arthur L. Riche
By
McCanna, Wintercorn & Morsbach
Attys.

Fig. 11

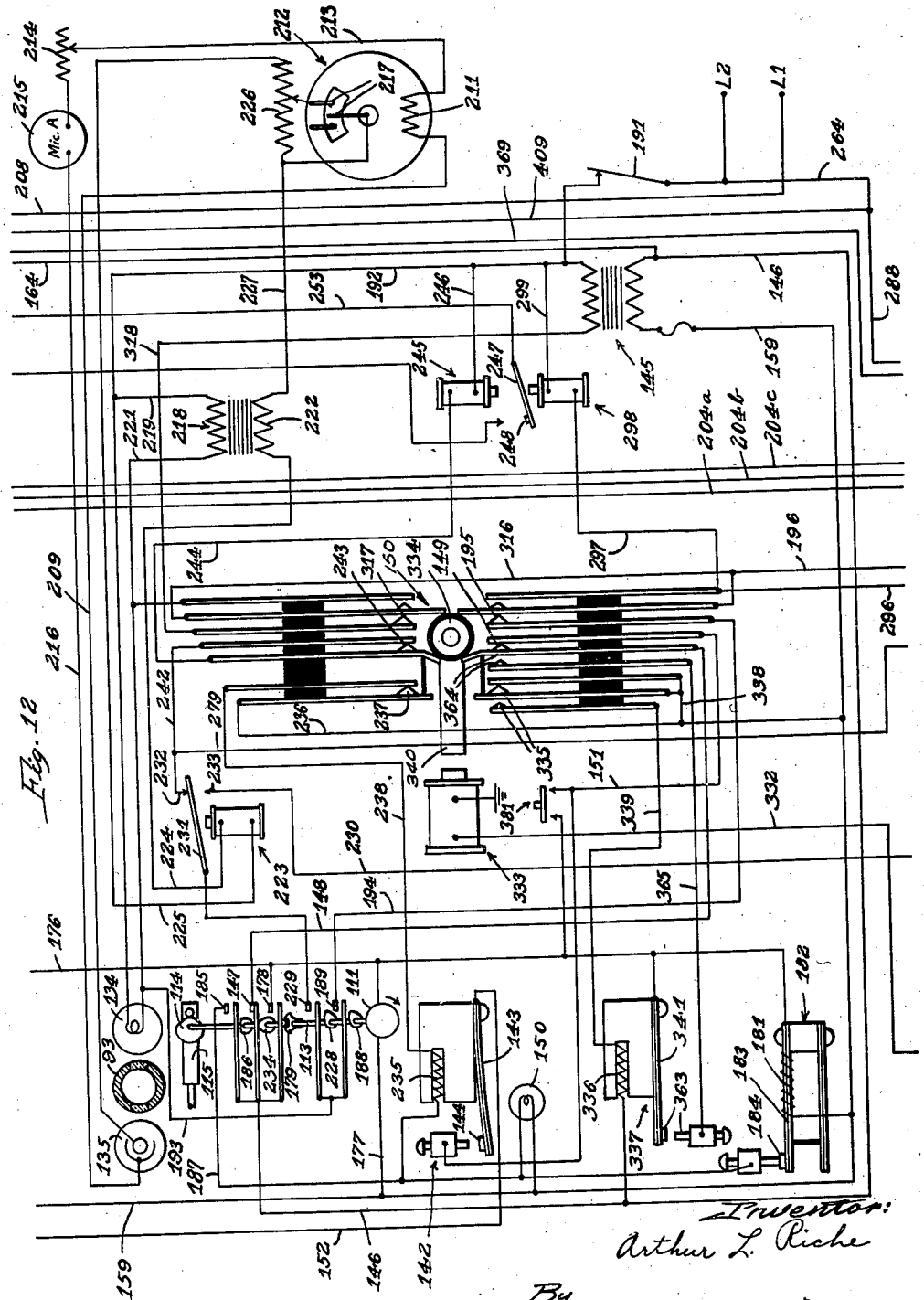

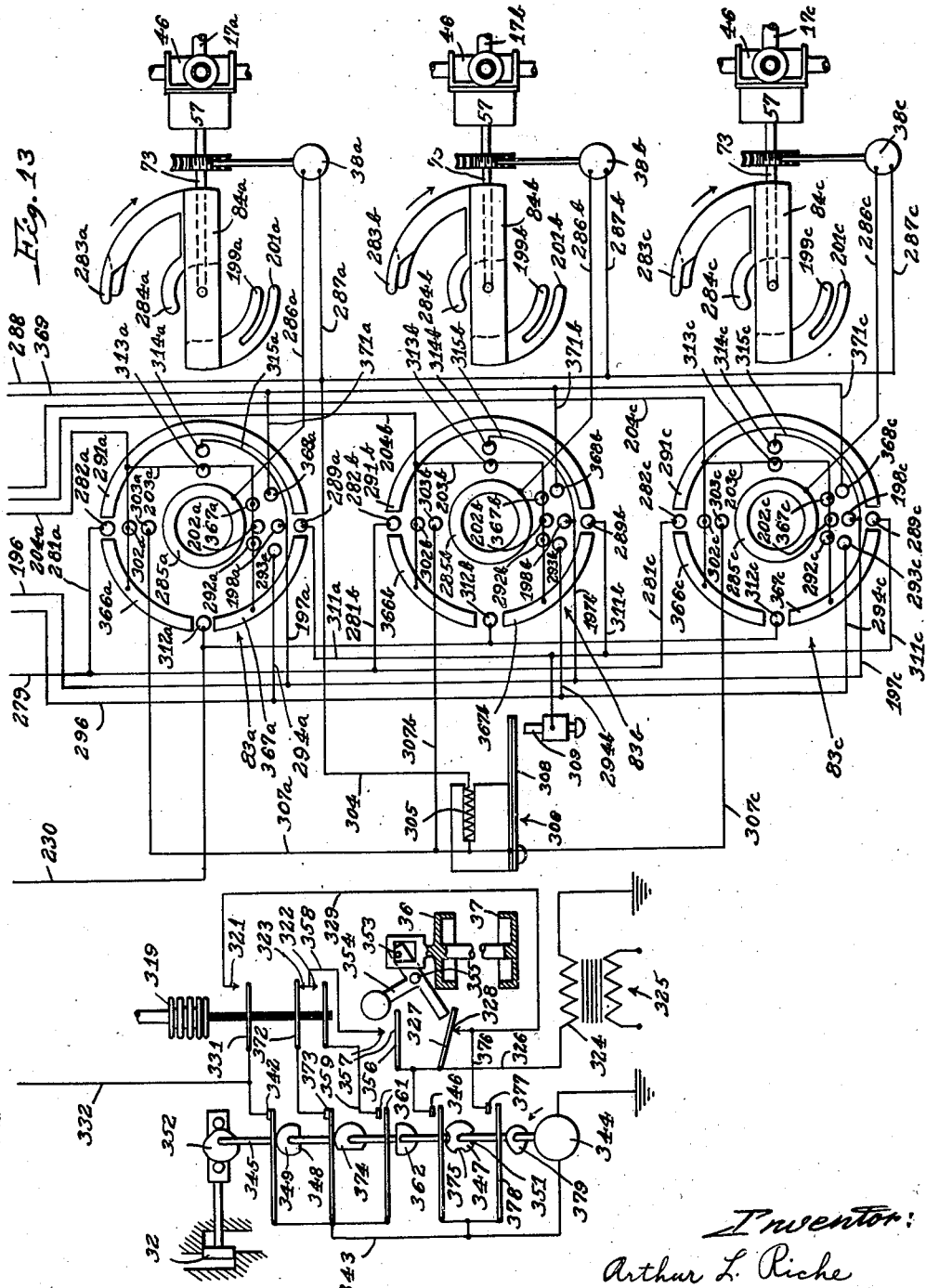

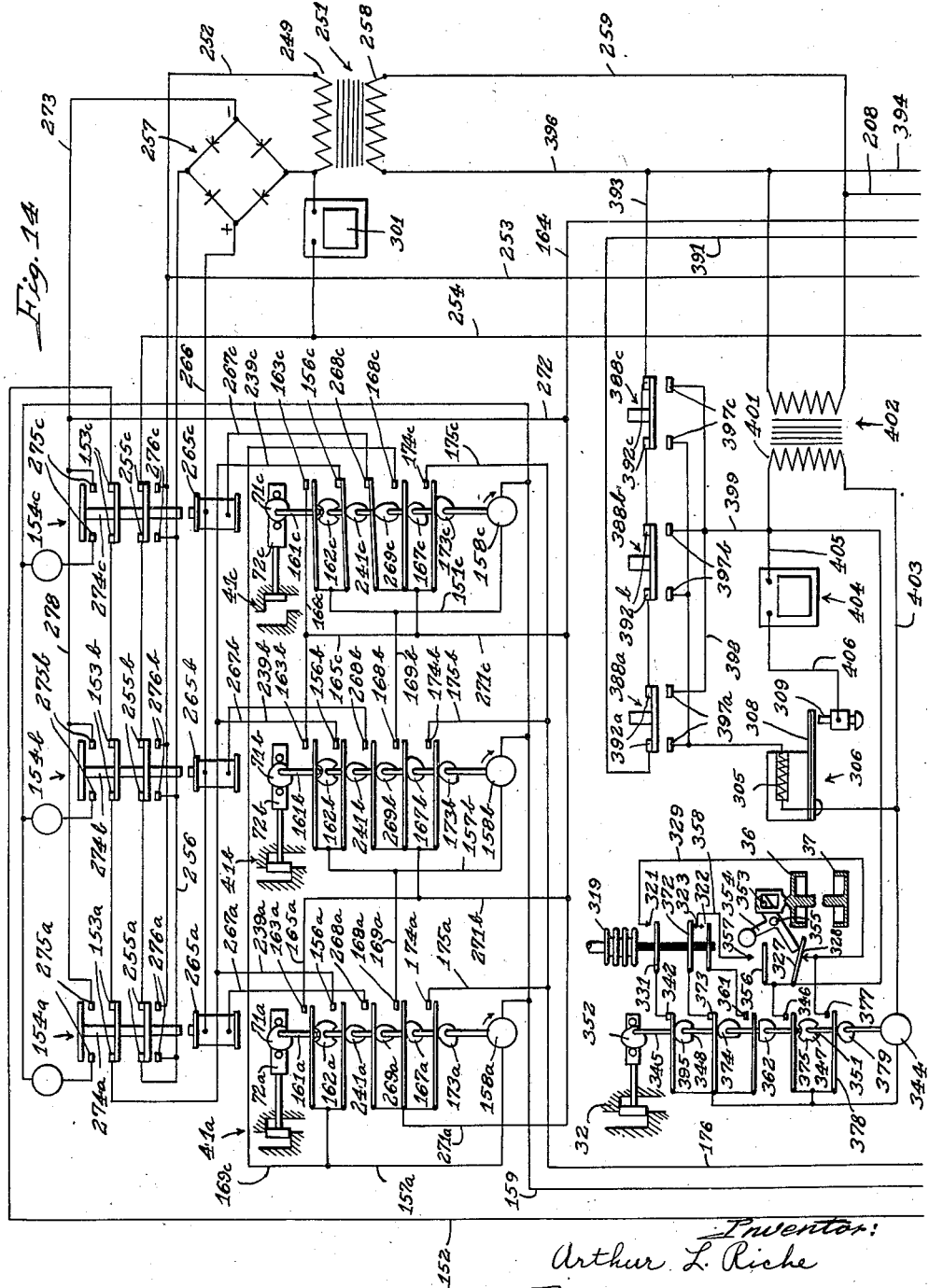

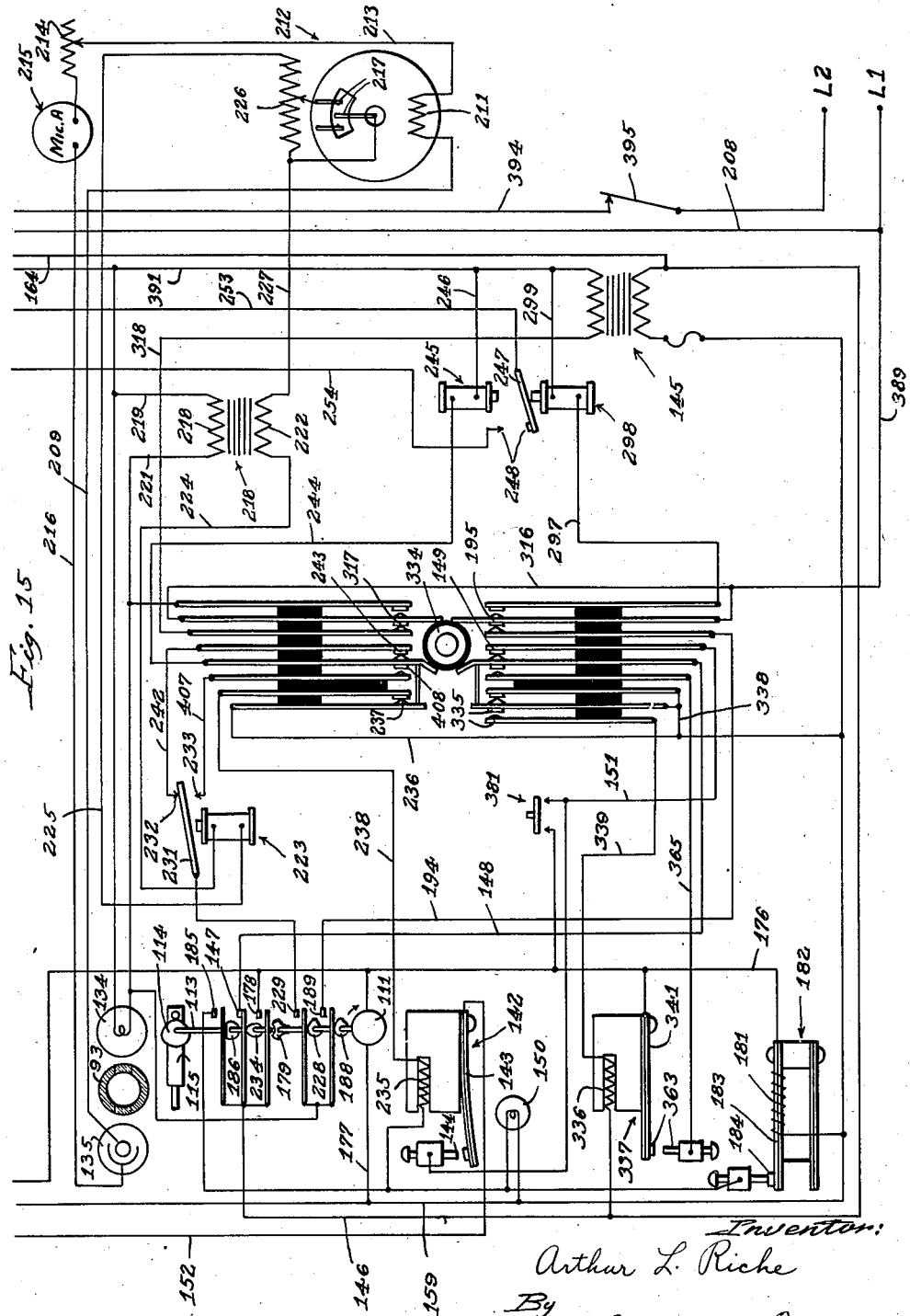

Patented Mar. 30, 1943

2,315,223

UNITED STATES PATENT OFFICE 2,315,223

WATER SOFTENER

Arthur L. Riche, Freeport, Ill.

Application March 21, 1938, Serial No. 197,134

31 Claims. (Cl. 210—24)

This invention relates to water treatment devices and the like and is of special utility in water softener installations of the type having a plurality of softener tanks, and refers particularly to means for controlling the operation thereof.

In water softener installations of the character mentioned, the use of which is largely confined to large industrial and municipal installations, the best known means for controlling the operation thereof has been meters connected to each of the softener tanks and set to emit a signal when a predetermined quantity of water has passed through the particular softener tank. This mode of control has been found to be objectionable for a number of reasons. For example, the meters are set to sound an alarm upon the passage of an amount of water such as theoretically to exhaust the mineral in the softener. However, many things may occur to vary the quantity of water which may be softened and to interfere with the regeneration of the softener which will change its regeneration capacity, as for example, the failure to maintain an adequate supply of salt in the brine tank, and under such circumstances hard water will be delivered from the tank before the meter actuates the signal. Furthermore, with this kind of construction it is necessary to at all times set the meter at a very conservative point so as to insure the delivery of soft water at all times regardless of the variations in hardness of the incoming water. A further objection to this type of construction is that it requires a separate meter construction on each softener tank, greatly increasing the cost of the mechanism. These are only a few of the many disadvantages in the prior art constructions, but they are sufficient to show the problem and illustrate the utility of the present invention.

An object of the invention is to provide a generally improved automatic water softener having improved means for controlling the operation and the regeneration thereof.

Another object of the invention is to provide an improved water softener of the type having a plurality of softening tanks wherein the effluent of the tanks is periodically tested for hardness, and wherein regeneration is initiated in response to the test.

A still further object of the invention is the provision of an automatic base exchange water softener of the type having a plurality of softening tanks wherein a single testing unit functions to test the effluent for hardness and to initiate and control the regeneration thereof in response to the test.

Another object of the invention is the provision of improved means for testing effluent from zeolite water softeners.

Other objects and advantages will appear from the following description and the accompanying drawings, in which—

Fig. 2 is a vertical section through a motorized multi-port valve suitable for use in my invention;

Fig. 3 is a face view of the ported body member of the valve;

Fig. 4 is a top view of the stem plate of the valve, the injector being shown in section;

Fig. 8 is a vertical fragmentary section through the tester showing some of the parts in elevation;

Fig. 9 is a section on the line 9—9 of Fig. 8;

Fig. 10 is a section on the line 10—10 of Fig. 9;

Figure 1:
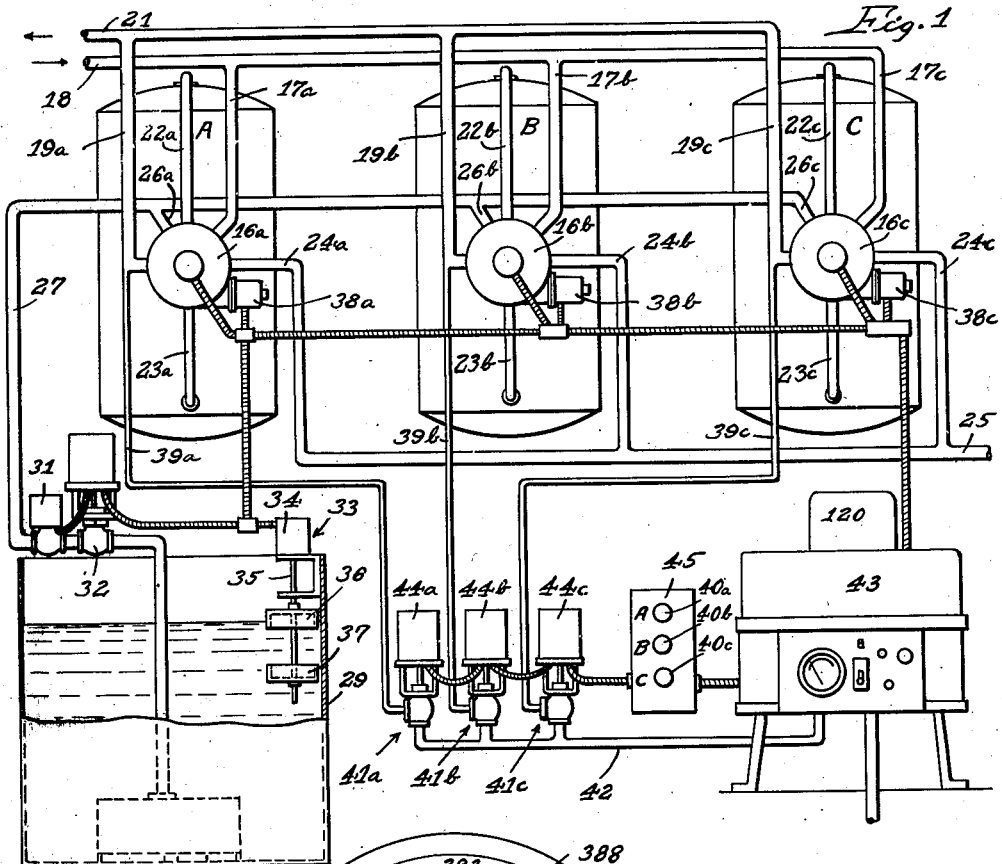
Figure 1 is a diagrammatic view of a fully automatic water softener embodying my invention, the installation having three softening tanks.
Figure 11:
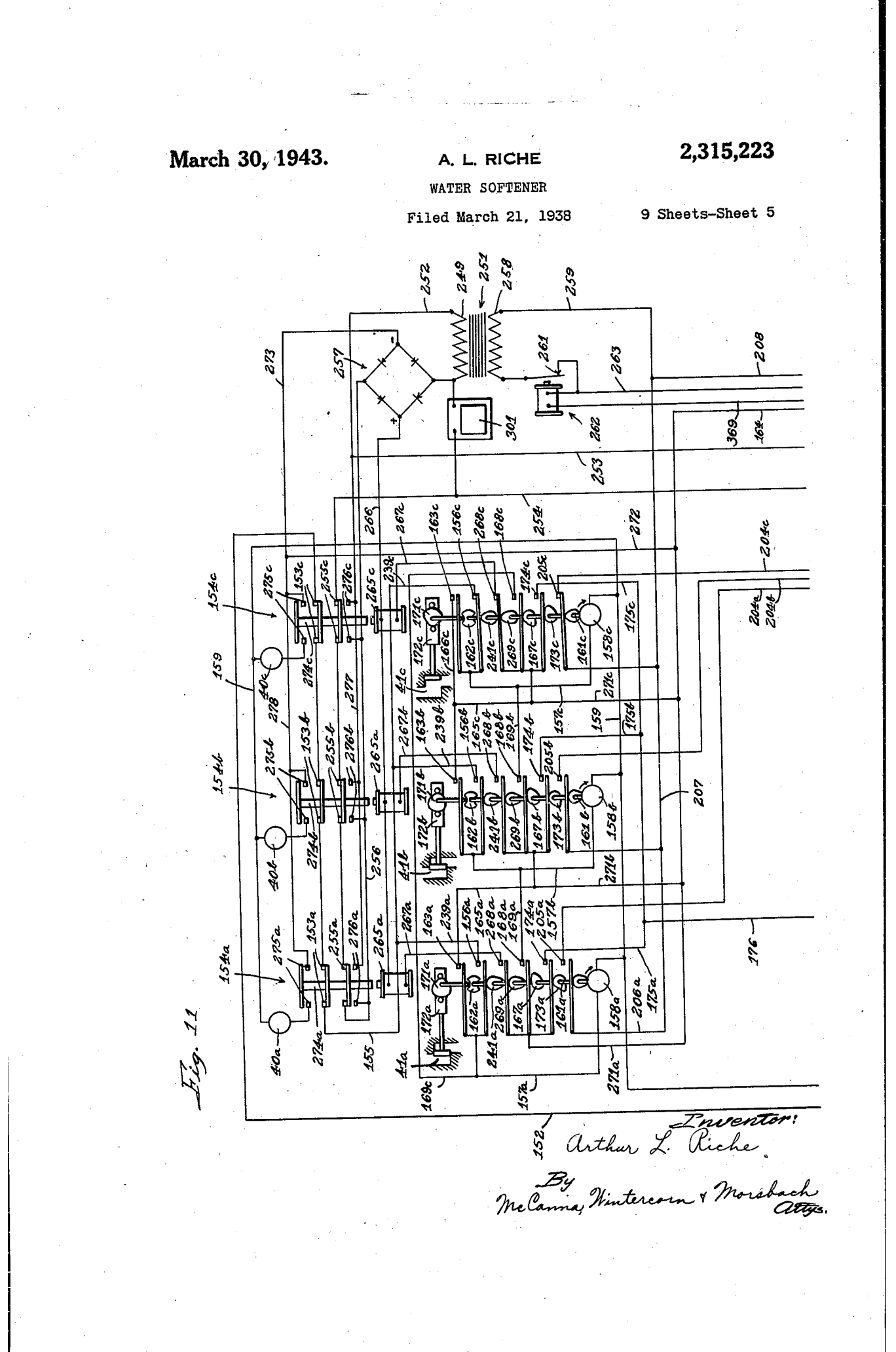

Figs. 11, 12 and 13 when taken together constitute a wiring diagram of the fully automatic water softener shown in Figure 1, Figs. 14 and 15 taken together constitute a wiring diagram of a semi-automatic water softener of the general form shown in Figure 1, but embodying only a part of the elements therein shown, Fig. 16 is a view on the line 16—16 of Fig. 17 partly in section showing the structure of the telephone relay or switch, and Fig. 17 is a top view of the telephone switch.

Referring first to Figure 1 which shows the general softener arrangement, the numbers A, B and C designate conventional zeolite softener tanks. Attached to each of the softener tanks are rotary multi-port valves designated generally by the numbers 16a, 16b and 16c, the valves having inlet pipes 17a, 17b and 17c connected to the hard water supply pipe 18, soft water outlet pipes 19a, 19b and 19c connected to the soft water or service pipe 21, pipes 22a, 22b and 22c connected to the top of the softener tank, pipes 23a, 23b and 23c connected to the bottom of the tank, and pipes 24a, 24b and 24c connected to a drain pipe 25. Pipes 26a, 26b and 26c likewise connect these valves to a brine pipe 27 which terminates at a filter cup 28 in the bottom of a brine tank 29. Positioned in the brine pipe 27 is a pressure actuated switch mechanism 31 and a motor actuated valve 32 for controlling the flow of brine through the pipe 27, as will presently be described. Positioned in the brine tank is a brine level control mechanism designated generally by the numeral 33 which includes a switch mechanism indicated generally by the numeral 34, a depending reciprocable actuating rod 35 upon which is positioned a top bell 36 and a bottom bell 37, so arranged that when the level of the brine in the tank drops below the level of the bell 37 the weight of the bell and the weight of the solution trapped therein is sufficient to move the rod 35 downward, and so that during the filling of the tank, when the level of the solution reaches that of the bell 36, the air trapped therein causes the rod 35 to be moved upward, such movement actuating the switch mechanism 34, as will presently be more fully explained. Each of the valves 16a, 16b and 16c are provided with a motor 38a, 38b and 38c for the purpose of driving these valves through their regeneration cycle and returning the same to the softening position.

According to one phase of the invention, the effluent water from each of the softening tanks is periodically tested for hardness, the test being conducted between the various softening tanks in sequence, which cycle of tests I have designated as the primary test cycle. When the test on any one of the softener tanks shows that the effluent thereof has reached a predetermined degree of hardness, the mechanism is such that the cycle of test is interrupted and the valve of the exhausted softener tank is automatically carried through its regeneration cycle and then returned to the softening position, whereupon the primary test cycle is automatically resumed. For this purpose sample pipes 39a, 39b and 39c are connected into the effluent pipes 19a, 19b and 19c, respectively, and lead through motorized valves designated generally by the numerals 41a, 41b and 41c to a common test pipe designated generally by the numeral 42. The pipe 42 is connected to the inlet valve of a tester designated generally by the numeral 43 and shown more in detail in Figs. 6 to 10, inclusive, the tester serving to test the effluent water from the softener tanks for hardness and for initiating the regeneration of the softener tanks when its test indicates a predetermined degree of hardness in the water and for controlling the various steps of regeneration. The sampling valves 41a, 41b and 41c are actuated by means of motor and switch mechanism attached to each valve as shown at 44a, 44b and 44c electrically connected to the testing device through a switch box 45 containing a plurality of relay switches as will presently be described, and a number of lamps 40a, 40b and 40c equal to the number of softener tanks and designated by similar numbers or letters as shown in Figure 1, for the purpose of indicating when the softener tanks are in process of regeneration.

While I have described the invention as embodied in a softener construction in which the base-exchange material is regenerated by means of salt brine and the test is conducted for hardness, the invention is also applicable to softeners and water treatment apparatus wherein base-exchange material is regenerated by other means such as acids or alkalies and the tests may be conducted for other properties.

The cycle of operation of the embodiment herein described will first be followed through in a brief description, and thereafter the particular mechanism by which this cycle of operation is produced will be described in detail. Assuming as a starting point that the tester has just completed a test on the softener tank No. C, that is, the tank at the right facing Figure 1, and that the test has found the effluent water from this tank to be soft. Under these circumstances the valve 41c is open and the valves 41a and 41b are closed. The inlet valve to the tester 43 is closed as will presently be described. After the lapse of a short period of time, which may be set depending upon the frequency of tests desired, a thermal timer within the testing mechanism closes, closing a circuit through the motor and switch mechanism 44c to close the sampling valve 41c and through the motor and switch mechanism 44a to open the sampling valve 41a, whereby effluent water from softener tank No. A will be conducted into the testing device by way of the pipe line 39a, the valve 41a and the line 42. Thereupon the tester 43 proceeds to conduct a test for hardness on the effluent from softener No. A. At the end of this test the inlet valve of the tester 43 is closed and if the result of the test is to show that the effluent water is soft, the mechanism remains in this position with the inlet valve of the tester closed and the sampling valve 41a open. During the period of the test the thermal timer is heated and as soon as the test is concluded the timer begins to cool. Upon the termination of the cooling period, the circuit will again be closed through motor and contact mechanism 44a causing the sampling valve 41a to be closed and the sampling valve 41b to be opened as previously described. This cycle of testing successive softening tanks continues in the same manner until the effluent from one of the tanks is found to be hard during the process of a test.

Assume for purposes of illustration that upon one of the successive tests the effluent from tank No. A is found to be hard in response to a test. Under these circumstances the primary cycle of test is interrupted, lamp No. A on the switch box 45 becomes illuminated and electrical energy is supplied to the motor 38a causing the control valve 16a to be indexed to the next position, in this instance the backwash position, in which water flows in a reverse direction through the tank. Upon the lapse of a predetermined period of time, determined by a timing device, the motor 38a is again energized, rotating the valve 16a to the next position for taking brine into the softener tank from the brine tank 29. In this position of the valve, an injector, presently to be described, functions to produce a suction or reduced pressure on the brine line 27 as a result of which the pressure switch 31 energizes the motorized valve 32 opening this valve and allowing the brine to flow through the softener tank. Brine continues to flow through the softener tank until the switch mechanism 34, actuated by the bell 37 energizes the motorized valve 32, closing the same. Water from the injector continues to pass through the softener tank for the purpose of washing out the spent brine. A predetermined time after the closing of the brine valve 32 the tester 43 starts making tests on the effluent from the softener tank, in this instance testing the effluent for the absence of hardness in the water, in other words, the absence of hardness producing constituents such as calcium and magnesium salts. These tests are conducted one after the other in the manner presently to be described, in rapid succession until a test fails to show the presence of any substantial degree of hardness, whereupon the tester functions to again energize the motor 38a causing the softener valve 16a to index to the succeeding or service position thereof in which water is delivered to the service pipe 21. Upon this movement of the softener valve 16a the pressure in the brine pipe 27 returns to normal, as a result of which the pressure switch 31 again actuates the motorized valve 32 opening the same and permitting water to flow into the brine tank 29. When the level of solution in the brine tank reaches a predetermined point as determined by the position of the bell 36, the rod 35 moves upward again actuating the switch mechanism 34 which causes the motorized valve 32 to again close, thus completing the cycle of regeneration.

Upon the return of the softener valve 16a to the service position, the tester 43 again takes up the duty of conducting the primary cycle of test, the thermal timer again closing and initiating a test on the next succeeding softener tank, in this instance tank No. B. The testing cycle then proceeds as heretofore described until another softener tank is found to be emitting water harder than that for which the tester is set, whereupon the regeneration of the softener tank in question is initiated. It will thus be seen that the operation of the softener is entirely automatic, requiring the attention of the operator only for the purpose of maintaining an adequate supply of salt in the brine tank and for maintaining an adequate supply of reagent for the tester 43, as will presently be set forth.

*Softener valve structure*

While any of a considerable number of motor operated multiple port valves may be used, many of which are known in the art and disclosed in the patent literature, I have herein shown for simplicity a plain multiple port rotary valve, the structure of which is shown with greater particularity in Figs. 2 to 4, inclusive. Since each of the softener valves 16a, 16b and 16c are identical, only a single valve will be described in detail. This consists of a ported body member 46 having a plurality of ports designated generally by the numerals 47, 48, 49, 51, 52, 53 and 54. The body member 46 also has a centrally disposed port 55 passing completely therethrough and connected to the hard water inlet pipe. The ports 47 and 53 are connected to the pipe running to the top of the softener tank and the port 49 is connected to the pipe extending to the bottom of the softener tank. The port 48 is connected to the soft water outlet pipe connected with the service pipe 21, the port 51 is connected to the drain pipe, the port 54 is connected to the brine pipe, and the port 52 is cored within the body of the plate 46 to communicate with the port 48, the latter serving to by-pass hard water during certain positions of the valve.

Secured to the face of the body member 46 is a ported gasket 56 secured in place by a housing designated generally by the numeral 57, which housing encloses a stem plate designated generally by the numeral 58 and shown more in detail in Fig. 4. The composition of the gasket 56 and the stem plate is such that the stem plate will move over the gasket without undue scoring thereof, such materials being known in the art. The stem plate has a flat lower surface contacting the gasket 56 to produce a seal therewith, and is provided with a central port 59 adapted at all times to communicate with the port 55 of the body member. The stem plate also has a port 61 extending therethrough for communication with one of the ports 47, 48, 49 and 51, and has a port 62 adapted to establish communication with the port 54 in the service position of the valve for the purpose of refilling the brine tank. The plate also has ports 63 and 64 located at 90° with respect to each other and communicating through a cored passage 65 for the purpose of conducting liquid from one of the body ports to another thereof. The plate also has a port 66 communicating with an injector comprising a casing 67 within which is positioned a venturi 68 and a jet 69. A port 72 in the plate also communicates with the casing 67, brine being drawn through this port by the action of water passing from the interior of the housing 57 through the jet 69 and the venturi 68, the combined flow of brine and water passing out through the port 66. The valve is adapted to pass through three steps in making a complete revolution as will be apparent from Fig. 13, the parts being shown in the service position in Figs. 2, 3 and 4. In this position of the valve, hard water enters the valve through the pipe 17a in the case of valve 16a, passes through the ports 55 and 59 into the housing 57 and thence through the ports 61 and 47 to the pipe 22a leading to the top of softener tank A. The soft water leaves the bottom of the tank through the pipe 23a communicating with the port 49, passes through the ports 49 and 64, through the channel 65 and the ports 63 and 48 to the soft water pipe 19a. During the first step of regeneration the stem plate moves clockwise facing Fig. 4 through 180° and comes to rest in this position. In this position of the valve, the hard water enters through the ports 55 and 59, passes out of the housing 57 by way of the ports 61 and 49, then passing by way of the pipe 23a to the bottom of the softener. Simultaneously water flows from the top of the softener through the pipe 22a to the port 47, thence through the port 64, the channel 65, the port 63 and the port 51 to the drain pipe 24a, thus back-washing the softener for the purpose of loosening the zeolite bed and removing extraneous matter which may have been filtered from the water and collected on the top of the bed. At the end of the backwash step, the stem plate rotates in a clockwise direction through 90° for the purpose of passing brine into the softener tank and for the purpose of rinsing the brine therefrom. In this position of the valve the port 61 is in communication with the port 48, allowing hard water to pass through the service pipe, the port 64 is in communication with the port 51 and the port 63 is in communication with the port 49, allowing liquid to pass from the bottom of the softener to the drain pipe. In addition, the port 72 of the injector is in communication with the port 54 and the port 66 of the injector is in communication with the port 53. Under these circumstances hard water passes through the jet 69 drawing brine by way of the brine pipe 26a through the venturi and supplying the same through the ports 66 and 53 to the top of the softener by way of the pipe 22a. Simultaneously liquid passes from the bottom of the softener through the ports 49 and 63, the channel 65 and the ports 64 and 51 to the drain pipe 24a. Thus brine is supplied to the softener until the supply thereof is shut off by the action of the valve 32, as heretofore described. Water continues to flow, however, after the supply of brine has been shut off and thus washes the mineral or zeolite bed free of salt and brine. When the mineral has been rinsed free of brine the stem plate indexes through a further 90° returning to the original service position thereof as shown in Fig. 4. For the purpose of indexing the valve, the stem plate has a stem 73 projecting outwardly therefrom and through a stuffing box 74 on the housing 57. A spring 75 is interposed between the stuffing box and the stem plate for the purpose of urging the plate against the gasket 56. The stem projects through a gear case 76 and has bearing support thereon as shown at 77 and 78 terminating in a switch box 79. The gear case 76 is supported on the valve housing 57 by means of brackets 81 and carries a worm gear 82, keyed to the stem 73, the worm gear being driven by a worm from the motor 38a in the case of the valve 16a to move the stem plate between its various positions. The switch box 79 carries a stationary switch member 83 and a movable switch member or rotor 84 is positioned on the end of the stem 73, the latter switch member carrying blades presently to be described more fully. A conduit 85 encloses and carries suitable electric wire for cooperation with the switch members 83 and 84.

Testing device

The mechanical features of the tester 43 are shown more in detail in Figs. 6 to 10, inclusive, and while some of the electrical elements thereof are shown in these figures, the detailed showing of the electrical elements is made in Fig. 12 and will be considered more in detail in connection with the description of the wiring circuit and the mode of operation. The testing device is substantially the same as that described and claimed in my copending application, Serial No. 40,379, filed September 13, 1935, entitled "Apparatus for treating water and the like," and in principle is similar to that shown and claimed in my copending application, Serial No. 369,592, filed June 10, 1929, entitled "Apparatus for automatically testing fluids." The numeral 86 indicates generally the top plate of a frame adapted to support and carry the various elements of the tester. A cover 88 rests over the plate and a gasket 89 is positioned therebetween to prevent the access of moisture to the area above the plate and the resultant precipitation of moisture on the outer surfaces of the optical parts which might occur under adverse conditions. The cover 88 is dome-shaped and encloses with the plate 86 all of the mechanism carried above the plate. The plate has an upstanding cell-supporting portion indicated generally at 91 having a cylindrical recess 92 for the reception of a glass tube 93, a gasket 94 being interposed between the end of the tube and its support. A housing 95 covers the opposite end of the tube and partially encloses the sides of the tube, but leaving a space on each side of the tube uncovered to provide windows as shown at 96. The liquid to be tested enters the cell by way of the tube 42 through a channel 97 into a valve chamber 98 and thence through a channel 99 into the interior of the observation cell. A valve 101 acts to close the channel 97 and has a stem 102 passing through an opening in an actuating arm 103, spaced nuts 104 and 105 thereon abutting against the face of the lever but allowing certain free movement of the lever with respect to the valve stem. The lever 103 is pivoted on the bottom of the plate 86 as shown at 106 and is operated by a pull rod 107, the pull rod passing through a flexible diaphragm 108, being clamped thereto by collars 109. The diaphragm prevents entrance of air into the area above the plate 86. The rod 107 is reciprocated by a motor 111 which functions through suitable gearing designated generally by the numeral 112 to drive a shaft 113 upon which is positioned an eccentric cam 114 which functions through cam follower 115 carried on the rod 107 to reciprocate the rod 107 upon suitable rotation of the shaft 113 and energization of the motor 111. A reagent of the type capable of producing a change in the optical properties of water proportional to the hardness producing constituents thereof, such for example, as soap, is conducted to the observation cell from a suitable source of supply such as a bottle or container 120 (Fig. 1) by a pipe 117 and passes through a ball check valve 118 and through a bore 119 to a diaphragm type pump, designated generally by the numeral 121 and thence through a channel 122, through a ball check valve 123 and a channel 124, into the interior of the observation cell formed by the glass tube 93 and associated parts. Liquid flows out of the observation cell by way of an overflow pipe 116 to drain. The pump 121 is of conventional design and includes a supporting bracket 125 attached to the bottom of the plate 86 which supports a rubber diaphragm 126 and a stem 127. The upper end of the stem carries a disk 128 bearing against the diaphragm and a spring 129 between the diaphragm and the frame acts to urge the stem downward. A spring 131 on the stem 127 moves the disk 128 through an injection stroke. The lower end of the stem 127 passes through an opening in the lever 103 and has spaced abutments 132 against which the lever abuts in its movement to actuate the pump. The lever is urged in a counterclockwise direction by means of a coiled spring 133.

During the first period of operation of the motor 111, the valve 101 is opened to establish a flow of water through the observation cell and the disk 128 of the pump is moved to a lower position, thereby drawing in a quantity of reagent past the check valve 118. This is accomplished by a clockwise rotation of the lever 103 by means of the rod 107 and the cam 114. Upon the next period of operation of the motor 111, the lever 103 and follower 115 drop into a notch in cam 114 permitting spring 133 to suddenly move in a counter-clockwise direction closing the valve 101 and injecting reagent into the observation cell past the check valve 123. During the last period of operation of the motor 111, a lamp 134 is caused to be illuminated, casting a beam of light through the windows 96 and upon a light sensitive or photo-electric cell 135, causing electrical devices, presently to be described, to be actuated or not actuated depending upon the intensity of the light reaching the photo-electric cell 135. This completes the cycle of operation of the testing device.

Means are provided for keeping the windows of the observation cell free of accumulation tending to interfere with the transmission of light therethrough. This includes a rectangular frame 136 positioned in the observation cell carrying a pair of blades 137 and 138 formed of spring metal and positioned to bear against the cylindrical inner surface of the tube 93. This frame has a trunnion 139 seated for rotation in the housing 95 and a shaft 141 connected to the cam shaft 113 and driven by the motor 111. The frame and attached blades move in a direction such that the scraping edge thereof is forward and the housing 95 covers the sides of the tube 93 to such an extent that the frame does not interfere with the passage of light through the windows during a large part of its movement, and so that the wiping operation can continue without interrupting the light beam. A gasket 140 seals the opposite end of the tube 93.

Wiring diagram and mode of operation

Directing attention now more particularly to Figs. 11, 12 and 13, which constitute when taken together, the wiring diagram of one embodiment of the softener, Fig. 11 shows the wiring arrangement of the motor and switch mechanism 44a, 44b and 44c of the sampling valves 41a, 41b and 41c, and also shows the elements of the switch box 45 and associated parts. Fig. 12 shows the wiring arrangement of the testing device. Fig. 13 shows the wiring arrangement of the valves 16a, 16b and 16c, the switch mechanism 34, the motorized brine valve 32, and the pressure switch 31. These views show the position of the parts after the conclusion of a test on the effluent from softener tank No. C and prior to the initiation of tests on the effluent from softener tank No. A. The thermal timer, heretofore referred to, which functions to determine the testing interval, is designated by the numeral 142 and the bimetal blade 143 thereof is cooling preparatory to closing contacts 144. When the timer cools sufficiently to close these contacts, current flows from the secondary of a transformer 145 through conductors 146, contacts 147, conductor 148, switch 149 of a conventional telephone switch indicated generally by the numeral 150, conductor 151, contacts 144 of the thermal timer, the blade 143, conductor 152, contacts 153c, 153b and 153a of relays 154a, 154b and 154c, conductor 155, contacts 156c of the motor and contact mechanism 44c, conductor 157c, motor 158c, and conductor 159, closing the circuit through the motor 158c. This initiates rotation of motor 158c and upon a slight rotation of the shaft 161c thereof, a cam 162c carried thereon closes contact 163c, thereby establishing a new circuit through the motor comprising a conductor 164, conductors 165c and 166c, the contact 163c, the conductor 157c, the motor 158c, and conductor 159. The cam 162c is so shaped that the contacts 163c will be maintained closed through a rotation of 180° of the shaft 161c, whereupon the circuit will be opened. During the latter part of this rotation of the shaft 161c the cam 167c closes the switch contacts 168c thereby closing the circuit through the motor 158a by way of the conductor 164, the switch 168c, conductors 169c and 157a, the motor 158a, and the conductor 159. As soon as the shaft 161a of the motor 158a has turned through a few degrees, a cam 162a, corresponding to the cam 162c, functions to close the switch 163a to establish a running contact by way of a circuit through conductors 164, 165a, contacts 163a, conductor 157a, motor 158a and conductor 159, which circuit is maintained closed until the motor shaft turns through 180°, whereupon the contacts 163a are opened in response to a depression in the cam 162a. During this movement a cam 171a on the shaft 161a cooperates with a cam slide 172a to open the valve 41a.

During the latter part of this rotation of the shaft 161a, a cam 173a functions to close contacts 174a for a short interval. Power thereupon flows from one side of the transformer 145, through conductor 164, contacts 174a, conductors 175a and 176 through the motor 111 of the testing device, and through conductors 177 and 159 to the opposite side of the transformer 145, thus starting the tester through a test cycle.

During initial rotation of the shaft 113, the contacts 178 are closed by operation of the cam 179 and are maintained closed until the shaft has rotated through 120°, closing of the contact 178 establishing a circuit through the motor 111 by way of conductor 146, contact 178, conductor 176, motor 111 and conductors 177 and 159. During this rotation of the shaft 113, cam 114 and cam follower 115 function to open the valve 101 allowing effluent water from the softener tank No. A to flow into the observation cell 93 through the valve 41a and the valve 101. Water flows through the observation cell 93 flushing out the previous sample contained therein by way of the drain pipe 116. It should be noted that the flow of water should be sufficiently long to permit of draining all of the water in the pipe 39a so that an accurate sample of the effluent from the softener tank may be obtained. Thus the time of flow will vary somewhat with different installations depending upon the length of the pipe 39a. Upon the closing of contact 185 during initial rotation of shaft 113 a signal lamp 150 becomes illuminated and remains so during the time a test is in progress.

During the period of operation of the motor 111 just described, a thermal timer heating coil 181 of a thermal timer 182 was energized, this coil being in parallel with the motor winding and being energized through a circuit including conductor 146, contacts 178, and conductors 176 and 159. This heating of the blade 183 of the thermal timer 182 causes contacts 184 to be opened during the period of operation of motor 111. When blade 183 has cooled sufficiently to permit closing of contacts 184, motor 111 will again be energized by way of conductor 146, contacts 185 which have been closed by action of a cam 186, conductor 187, contacts 184, blade 183, conductor 176, motor 111, and conductors 177 and 159. At the start of this rotation of the shaft 113, cam 179 again closes contacts 178, re-establishing the previously described circuit through the motor 111 and causing the same to drive the shaft through an additional 120°. During this rotation of the shaft 113, cam 114 and cam follower 115 cause the closing of the valve 101 of the tester and coincidentally therewith cause the injection of reagent into the observation cell by actuation of the lever 103 of the tester and the pump diaphragm 126. Here again during the period of rotation of the motor 111 power flows through the coil 181 of the thermal timer 182 heating the blade 183 and causing the opening of the contacts 184, which contacts open prior to the stopping of the motor 111. The sample and reagent are allowed to mix in the observation cell during the period of time required for the cooling of the blade 183 and the reclosing of contacts 184. When contacts 184 reclose, motor 111 is again started and shortly after the start of rotation of the shaft 113 contacts 178 are again closed by cam 179, reestablishing the previously described circuit through the motor and causing the motor to rotate through a final 120°. During this period of rotation of the motor 111, a cam 188 on shaft 113 causes the closing of contacts 189 for a short interval, thus supplying 110 volt power to the lamp 134 by way of a circuit from a main power switch 191 connected to power line L2, conductor 192, lamp 134, conductor 193, contacts 189, conductor 194, switch 195 of telephone switch 150, conductor 196, conductor 197a, contact 198a, blades 199a and 201a, contact button 202a, conductors 203a and 204a, contact 205a (Fig. 11), conductors 206a and 208, to the other side L1 of the power lines. This illuminates the lamp 134 and causes light to pass through the observation cell 93 and be incident upon photo-electric cell 135. The photo-electric cell 135 generates current which feeds through conductor 209 to the winding 211 of a galvanometer relay designated generally by the numeral 212, through conductor 213, a resistor 214, a micro-ammeter designated generally by the numeral 215, and a conductor 216. If the water in observation cell 93 is free from hardness producing constituents, enough light will impinge upon photo-electric cell 135 to sufficiently energize galvanometer relay 212 so that its contacts 217, which are normally in the open position as shown in Fig. 12, will be closed. In the meantime, the primary of a transformer designated generally by the numeral 218 has been energized, this transformer being connected in parallel with the lamp 134 by means of conductors 219 and 221. The secondary 222 of the transformer 218 causes current to flow through the winding of a relay 223 by way of conductors 224 and 225, a resistor 226 and a conductor 227. The current flowing to relay 223 is not sufficient normally to pick up this relay, but upon closure of the contacts 217 of the galvanometer relay 212, enough of resistance 226 will be shunted out to so increase the current through relay 223 as to energize it. The function of the resistor 226 is to minimize the current required to be carried by the delicate contacts of galvanometer relay 212. Under the conditions shown it is only necessary that these contacts carry the marginal current which is the difference between pick-up and not pick-up of the relay.

At about the same point in the rotation of the shaft 113 as the contacts 189 are closed, a cam 228 functions to close contacts 229. These contacts are closed a short interval after the contacts 189. If the water flowing through the observation cell 93 was substantially free of hardness, the relay 223 will pick up drawing the switch lever 231 thereof away from the contact 232 and into engagement with contact 233. The contact 233 is at this time connected to open contact so that no action results from the energization of the relay 223. When the tester motor 111 completes its third 120° rotation of the cam shaft 113, the contacts 147 are made by means of a cam 234 on the shaft 113. During the entire period through which the test is being conducted, the thermal timer 142 is being heated by action of a heating coil 235 thereof energized through a circuit including conductor 159, a conductor 236, switch contacts 237, a conductor 238, the heating coil 235, a conductor 187, contacts 185, and conductor 146, as a result of which the contacts 144 of the thermal timer are open at the conclusion of the test. At the conclusion of a test the contacts of the various instrumentalities are brought into position such that the closing of the contacts 144 will initiate a new test on a subsequent softener tank, this circuit being by way of conductor 146, contacts 147, conductor 148, switch contacts 149, conductor 151, contacts 144 of the thermal timer, blade 143 thereof, conductor 152, contacts 153c, 153b and 153a, conductor 155, conductor 239a, contacts 156a which were closed by a cam 241a on the cam shaft 161a in response to the last movement of the motor 158a, conductor 157a, motor 158a, and conductor 159.

An interval elapses between the conclusion of the test on tank No. A and the initiation of the test on softener tank No. B, the length of this interval being determined by the time required for the cooling of the thermal timer 142. Upon the closing of thermal timer 142 the motor 158a will be energized through the circuit just described, rotating through 180°, by action of cam 162a in the manner heretofore described for motor 158c, thus closing the valve 41a. During this rotation of the motor the contacts 168a are momentarily closed by cam 167a in approaching the closed position of the valve shown in Fig. 11. This energizes motor 158b by way of a circuit including conductor 164, contact 168a and conductors 169a and 157b and conductor 159, causing motor 158b to rotate cam shaft 161b, cam 162b closing contact 163b to establish a holding circuit between conductors 164 and 159 by way of conductor 165c, contacts 163b, conductor 157b and motor 158b, causing the same to rotate through 180° as determined by the cam 162b. The valve 41b is likewise opened by action of the cam 171b. The test on the sample of water entering the testing device through valve 41b is carried out in the manner heretofore described through circuits mentioned in the previous discussion or through parallel circuits obvious from the drawings. Cams and contacts associated with the cam shaft 161b are identical in every respect with the cams and contacts heretofore described, and the circuits controlled thereby as indicated by the letter b attached thereto are parallel with those heretofore described having the letter a attached thereto.

This primary cycle of tests wherein one softener tank after the other is tested for hardness continues in the manner described until one of the tests shows the effluent from one of the tanks to have attained greater than a predetermined degree of hardness. Thus, so long as the effluent from all of the softener tanks is found to be free from hardness, successive tests will be made, the frequency of test being timed by the cooling cycle of the thermal timer 142.

*"Regeneration control"*

I have heretofore described the operation of the device in its primary test cycle in the routine testing, in succession, of the effluent from the softener tanks, for the purpose of determining when hardness appears in the effluent thereof, the description being based on the premise that the effluent continued to flow soft. I will now describe the operation of the device when the effluent from a softener proves to be hard. During the test, it will be recalled, that the lamp 134 casts a beam of light through the observation cell 93 onto the photo-electric cell 135. When the water is soft the passage of light through the observation cell is substantially unobstructed and the flow of current from the photo-electric cell is sufficient to actuate the relay 223 causing the same to pick up and break the contact 232. However, when the water entering the observation cell 93 has any substantial degree of hardness, the passage of light therethrough is obstructed and the current flowing through the galvanometer relay 212 will be insufficient to close the contacts 217 thereof. As a result, no part of the resistance 226 will be shunted out of the circuit of the relay 223 and consequently this relay will not pick up and the contact 232 will remain closed. Under these circumstances when switch 229 closes, 110 volt current flows from the power line L1 through conductors 208 and 206a, contact 205a, conductors 204a and 203a, contact button 202a, contact blades 201a and 199a, contact button 198a, conductors 197a, 196, switch 195, conductor 194, contacts 189 and 229, relay blade 231, contacts 232, a conductor 242, switch contacts 243, a conductor 244, a relay designated generally by the numeral 245, a conductor 246, the main switch 191, back to the power line L2, thus closing power for picking up the arm 247 of the relay 245 and closing the contacts 248 thereof. Closing of the contacts 248 completes a circuit including the secondary 249 of a transformer designated generally by the numeral 251, a conductor 252, a conductor 253, contacts 248, a conductor 254, contacts 255c, 255b and 255a of the relays 154a, 154b and 154c, conductor 256, and a rectifier 257, the opposite side of which is connected to the secondary of transformer 251. The primary 258 of the transformer 251 is energized through a circuit including the power line L1, conductor 208, a conductor 259, primary 258, contacts 261 of a relay designated generally by the numeral 262, a conductor 263 and a conductor 264 to the power line L2. Direct current from the rectifier 257 is therefore supplied to the coil 265a of the relay 154a by way of a circuit including a conductor 266, the coil 265a, a conductor 267a, contacts 268a, which have been closed by action of a cam 269a, and conductors 271a, 164, 272 and 273. Upon this energization of the relay coil 265a the movable element 274a thereof moves to its opposed position, opening the contacts 153a and 255a and closing contacts 275a and 276a. The relays 154a, 154b and 154c are locking relays and upon actuation of the same, lock up and remain locked up until the completion of the regenerating operation, being held in the locked position by way of the previously described circuit through the coil 265a, power being supplied to the rectifier 257 at this point by way of a circuit including secondary 249, conductor 252, a conductor 277, contacts 276a, and conductor 256. Under these circumstances, the lamp 40a will be illuminated by current provided through a circuit including transformer 145, conductor 159, lamp 40a, contact 275a, and conductors 278, 272 and 164. This pilot lamp serves to indicate which softener tank is under regeneration. It will also be seen that the motor 158a cannot be initiated due to the opening of the contact 153a which remains open until the regeneration of softener tank No. A has been completed and valve 16a is returned to the service position.

When the relay 223 fails to pick up, current also flows from the line 242 through conductor 279 and conductor 281a to a contact button 282a, thence through a blade 283a to a blade 284a, from the blade 284a to a contact ring 285a, from the contact ring 285a through a conductor 286a to valve motor 38a and thence by way of conductors 287a, 288 and 264 back to the power supply line L2. Thereupon the motor 38a drives the stem 73 of the valve 16a and the rotor 84a through 180°, or until the blade 283a makes contact with the contact button 289a, also moving the stem plate 58 to the back-wash position. During this movement blade 283a moves off the contact button 282a and onto a segment 291a, at which time it receives power through a circuit completed by conductor 204a, contact 205a, conductors 206a, 207 and 208 to the main power line L1, this supply of current being terminated upon movement of the blade from the segment 291a to the contact button 289a.

During this rotation of the rotor 84a, blades 199a and 201a complete a circuit between contact buttons 292a and 293a. This causes current to flow through a circuit including, beginning with the power line L1, conductors 208 and 207, conductor 206a, contacts 205a, conductor 204a, conductor 203a, contact button 292a, contact blades 201a and 199a, contact button 293a, conductor 294a, conductors 296 and 297, the coil of a relay designated generally by numeral 298, a conductor 299, and switch 191 to power line L2, thus actuating relay blade 247 and opening the contacts 248, as a result of which the flow of current through a bell 301 is opened. This circuit was closed upon the closing of the contacts 248 so as to sound an audible alarm that the mechanism was going into regeneration.

As the rotor 84a reaches the end of its said 180° rotation, the blades 201a and 199a make contact with contact buttons 302a and 303a, thereby closing a circuit through 110 volt current by way of power line L2, conductors 264 and 288, a conductor 304, heating coil 305 of a thermal timer designated generally by the numeral 306, a conductor 307a, contact buttons 303a and 302a, and blades 199a and 201a, conductor 204a, contact 205a, conductors 206a, 207 and 208 to the power line L1. This causes the thermal timer 306 to heat, warping bimetal blade 308 toward a contact 309. When the bimetal blade 308 closes contact with the contact 309, circuit is closed through motor 38a by way of power line L2, conductors 264, 288 and 287a, motor 38a, conductor 286a, contact ring 285a, blades 284a and 283a, contact point 289a, a conductor 311a, contact 309, bimetal blade 308, conductor 307a, contact buttons 303a and 302a, and blades 199a and 201a, conductor 204a, contact 205a, conductors 206a, 207 and 208, back to the main power line L1, causing motor 38a to run, indexing the stem plate 58 and the rotor 84a of the valve 16a through 90° to the next position thereof. This brings the blade 283a of the rotor 84a into contact with contact button 312a and brings blades 199a and 201a into contact with contact buttons 313a and 314a. The latter re-establishes the circuit through the transformer 145 of the testing device by way of the power line L1, conductors 208, 207 and 206a, contacts 205a, conductor 204a, conductor 203a, contact buttons 313a and 314a and blades 199a and 201a, a conductor 197a, conductor 196, a conductor 316, switch contacts 317, a conductor 318 through the primary of transformer 145 and through switch 191 to the power line L2.

Figure 6:
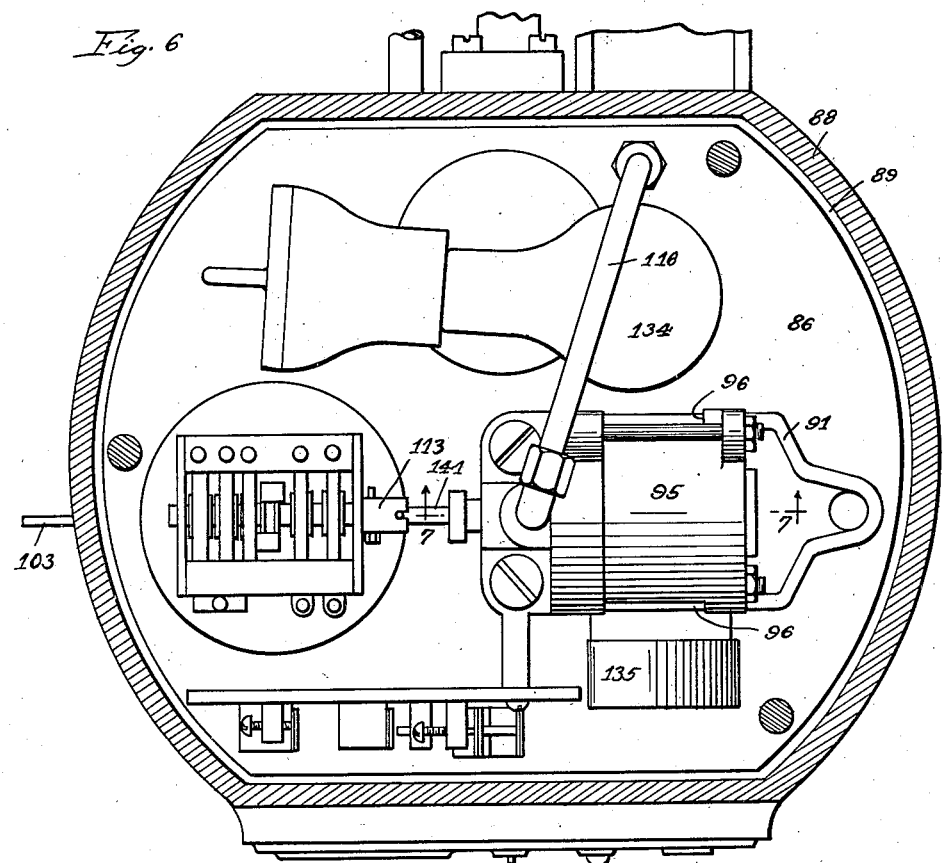
Fig. 6 is a horizontal section taken through the cover of the testing device.
Figure 7:
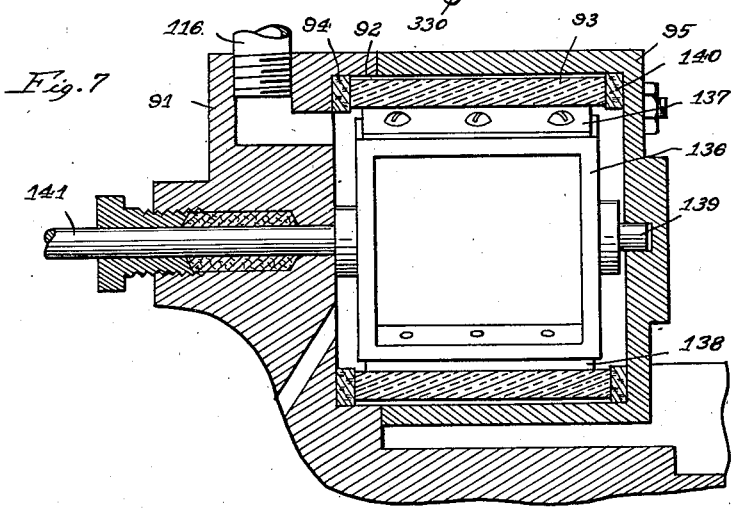
Fig. 7 is a section on the line 7—7 of Fig. 6.

The last described movement of motor 38a brings the stem plate 58 into the brine intake position. In this position of the valve, the injector mechanism carried on the stem plate 58 functions to produce a reduced pressure in the brine line 27 as heretofore described, which causes a bellows 319 of the pressure switch 31 to contract, closing contacts 321 and opening contacts 323. This serves to close a circuit through the secondary 324 of a transformer designated generally by the numeral 325 by way of a conductor 326, a switch blade 327, contact 328, a conductor 329, contacts 321, switch blade 331, a conductor 332, and a coil 333 of the telephone switch 150, the secondary of the transformer and the terminal of the coil being connected to ground, as shown, to complete the circuit. Completion of the circuit through the coil 333 acts through magnetic armature 340 to shift the main switch control 334 to a position to open switch contacts 237, 243 and 149, and to close additional contacts as will appear from the following description. The telephone switch 150 is also capable of manual operation by means of a knob 330 (Fig. 6). It will be seen that since switch contacts 149 are now open, the thermal timer 142 can no longer exercise control over the initiation of the test. Actuation of the switch 334 operated to close switch contacts 335 completing a circuit through the heating coil 336 of a thermal timer 337 by way of conductor 159, conductor 236, a conductor 338, contact 335, a conductor 339, coil 336, and conductor 146, thus causing the thermal timer 337 to heat and warp a bimetal blade 341. This causes a delay in the start of the tests by the testing device in order to permit of rinsing away of the greater portion of the heavy brine during the salting and the rinsing steps before the tests are taken up, which heavy brine might cause undesirable curds to form in the observation cell 93.

Upon the closing of contact 321, a second circuit is established through the motor of the brine valve 32 by way of secondary 324 of transformer 325, conductor 326, blade 327, contacts 328, conductor 329, contacts 321, blade 331, contacts 342, a conductor 343, motor 344 of the brine valve 32, to ground, causing the motor to start rotation of cam shaft 345 driven thereby. After the cam shaft 345 turns through a small angularity holding contacts 346 are closed by operation of a cam 347. The motor 344 stops in response to opening of the contact 342 by action of a flat spot 348 on a cam 349 and by opening of the contact 346 by action of a recess 351 on cam 347. During this rotation of cam shaft 345, cam 352 functions to open brine valve 32, thus permitting brine to flow into softener tank No. A under the sucking action of the injector. When the brine in brine tank 29 descends to a predetermined level, the bell 37 sinks downward drawing the end 353 of a toggle 354 downward, rotating the toggle about its pivot point 355, and rotating switch lever 327 to open the contact 328. Simultaneously switch lever 356 is rotated to close the contacts 357. Closing of contacts 357 again completes the circuit through motor 344 by way of the secondary 324 of transformer 325, conductor 326, blade 356, contacts 357, a conductor 358, contacts 322, which are closed by action of the bellows 319, a conductor 359, contacts 361 which are closed by action of a cam 362 on cam shaft 345, conductor 343, to motor 344. It will be seen that the cam 362 is so shaped as to keep the contact 361 closed through 180° rotation of the shaft 345 during which rotation the cam 352 functions to close the brine valve 32. Thereafter water continues to flow through the softener by way of the jet 69 and the port 66 of the stem plate 58 as heretofore described, thus rinsing the brine from the softener.

During the introduction of brine into the softener, the thermal timer 337 has been in process of heating and eventually the blade 341 thereof warps sufficiently to close the contacts 363 thereof. Closing of contacts 363 completes the circuit to the tester motor 111 by way of conductor 146, contact 147, conductor 148, switch contact 364, a conductor 365, contact 363, timer blade 341, conductor 176, motor 111, and conductors 177 and 159, causing the tester to proceed through a test cycle. Since at this point the wash or rinse water from the softener will normally contain an appreciable amount of calcium and magnesium salts, the test in the observation cell 93 will show hardness and the light passing therethrough will be obscured to such an extent that the relay 223 will not pick up. No action occurs as a result of these tests since the switch contacts 243 are open. Since the thermal timer 337 is continuously heated, the contact 363 will remain closed and the tester will immediately start a second testing cycle at the close of the first, and will make one test after another without intervals between until the wash water is sufficiently free of hardness producing salts as to produce substantially no obscuration of the light passing through the observation cell 93, or in other words, until the softener is in condition for return of the softener valve to the service position thereof. However, when clear soft water begins to flow through the observation cell, sufficient current will flow from the photo-electric cell 135 in response to a test to cause the contacts 217 of galvanometer relay 212 to close, thus causing relay 223 to pick up, closing contacts 233 and establishing a circuit through motor 38a by way of conductors 264 and 288 from power line L2, conductor 287a, motor 38a, conductor 286a, conductor ring 285a, blades 283a and 284a, contact button 312a, conductor 230, contact 233, relay blades 231, contact 229, contacts 189, conductor 194, switch contacts 195, conductor 196, conductor 197a, contact buttons 314a and 313a, and blades 199a and 201a, conductor 202a, conductor 204a, contacts 205a, conductors 206a, 207 and 208, to the power line L1. The motor 38a thereupon runs until the stem plate 58 has rotated back to the service position and the rotor 84a has moved through 90°, or until the blade 283a again makes contact with the button 282a, thus completing the cycle of rotation of the softener valve 16a. The blade 283a rides on a segment 366a which receives power from the line 204a while traveling from the button 312a to the button 282a. As the blade 283a travels from the button 289a to the button 312a it likewise rides on a segment 367a receiving power from the line 204a.

As the rotor 84a approaches its initial position, blades 199a and 201a make contact with buttons 367a and 368a, closing a circuit through the coil of relay 262 by way of conductors 264 and 263 from the power line L1, the coil of relay 262, a conductor 369, a conductor 371a, button 368a, blades 199a and 201a, button 367a, conductor 203a, conductor 204a, contacts 205a and conductors 206a, 207 and 208 connecting to the power line L1, thus momentarily interrupting the flow of current through the primary of the transformer 251, and momentarily cutting off the supply of energy to the rectifier 257 and its associated circuit, whereby to release the relay 154a and shift the contacts thereof to the position shown in Fig. 11. This returns the relays 154a, 154b and 154c to the position in which the successive tests on the effluent of the various softeners may again be taken up by the testing device.

Upon the return of the softener valve to the service position, the injector mechanism on stem plate 58 ceases to function, and the reduced pressure on the bellows 319 no longer exists. Under these circumstances the associated switch levers drop to the position shown in Fig. 13, whereupon the motor 344 is energized through a circuit, including secondary 324 of the transformer 325, conductor 326, blade 356, contact 357, conductor 358, contact 323, blade 372, contact 373 at this point held closed by action of a cam 374 on the cam shaft 345, conductor 343, and motor 344, causing the motor to start and rotate the cam shaft 345 and cam 352 to move the valve 32. Upon initial movement of cam shaft 345, cam 347 establishes a new circuit through the motor by way of the secondary 324, conductor 326, contact 346, and conductor 343. The shaft will then rotate through substantially 270° stopping when the notch 375 of the cam 347 comes opposite its associated blade, the contact 373 having been held closed by operation of cam 374 at the 180° position. In this position of the cam shaft, the valve 32 is held slightly open and water flows back from the softener to refill the brine tank, the bell 36 rising with increase in level in the brine tank and throwing the toggle 354 to the position shown in the drawings, closing contact 328 and opening contact 357. This establishes a new circuit through the motor 344 by way of the primary 324, conductor 326, blade 327, contacts 328, a conductor 376, contact 377, blade 378, conductor 343 through the motor and to ground, contacts 377 being closed at this point by action of a cam 379 on the cam shaft 345. This causes the motor 344, the cam shaft 345 and associated switches to return to their initial position, closes the brine valve 32 and returns the entire system to its original condition, the motor 344 being stopped when the cams 379 and 347 allow the contacts 377 and 346 to open.

Upon the return of the softener valve 16a to the service position and the return of the pressure in the bellows 319 to normal, the relay coil 333 is deenergized by opening of contact 321, permitting the switch member 334 to return to the normal position shown in Fig. 12. A push button switch 381 is provided to manually close the circuit between the conductors 151 and 176 in order to initiate a test manually at any time without awaiting the closing of the thermal timer 142 as heretofore described, whereupon the tester and the sampling valve motor mechanism will pass through one test of the primary testing cycle in the manner described.

In the preceding paragraphs I have described the complete regeneration of softener tank A, explaining the steps involved and tracing the various circuits and electrical elements functioning to perform the various operations. The regeneration of each of the other softener tanks is conducted in like manner through parallel circuits and similar elements, and the regeneration thereof may be traced by following the previous description and substituting the numerals having the letter b or the letter c following the same in place of those having the letter a, by shifting the order of the letters in an obvious manner, the letters a, b and c designating analogous circuits and elements for the softener tanks A, B and C, respectively.

It will be seen that the device shown in Figs. 1 to 4 and 6 to 13, inclusive, is entirely automatic in its operation, and no manual operation is required to maintain the softeners in continuous operation other than maintaining an adequate supply of salt in the brine tank 29 and of reagent in the container 120. It will further be noted that regeneration is initiated and the softener tank is returned to service, not in response to any arbitrary measurement, but in response to the presence or absence of the property desired. In other words, regeneration is initiated in response to failure of the softener tank to perform its required function. Attention is also directed to the fact that any number of softener tanks may be placed in the installation, three having been herein shown, by merely duplicating the equipment designated by the lettered numerals and the operation and regeneration thereof will be controlled through the single testing mechanism, which functions to successively test the effluent from the softener tanks through a cycle and to temporarily interrupt the cycle to conduct regeneration of the softener tanks as required.

*Manual operation*

Figure 5:
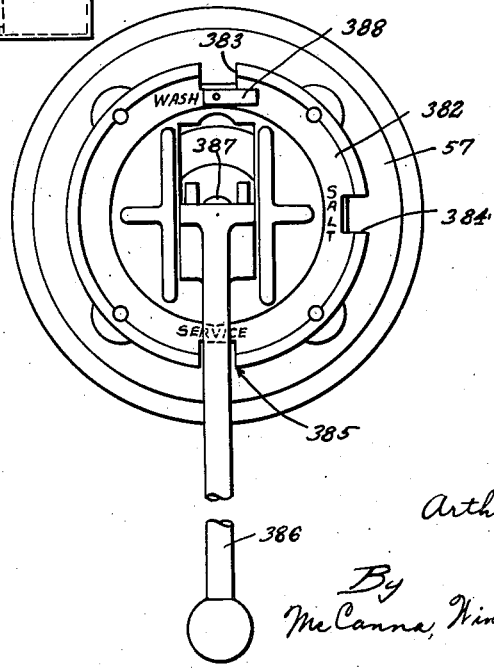
Fig. 5 is a face view of a manually operated valve suitable for use in one embodiment of my invention.

However, for simpler and less expensive installations such as those designed for use where there is an operator constantly at hand with sufficient time to move the softener valves manually, the motor driven valves 16a, 16b and 16c, and their driving and control elements may have substituted therefor manually operated valves such as shown in Fig. 5, which valves have a stem plate, body member and port arrangement identical with that shown in Figs. 3 and 4 and are connected to the softener pipes in the same manner. The valve has, however, manual means for shifting the stem plate between its various positions. Such valves are now well known in the art, one example being that shown in my prior Patent 2,047,131. The valve shown in Fig. 5 is identical with that shown in my prior patent with the exception that the port arrangement is similar to that shown in Figs. 3 and 4 of this application, said valves being known in the art as "lift-turn" valves and being operated by rotating the handle first on an axis transverse to the stem for the purpose of lifting the stem plate, then rotating the handle about the stem as an axis to rotate the stem plate to the next succeeding position, and then again rotating the handle about the transverse axis to reseat the valve.

In the case of manually operated valves, the structure of Figure 1 is wired and contains electrical elements as shown in the wiring diagram of Figs. 14 and 15, the diagram being essentially the same except for the elimination of electrical control elements for the main softener valves. For the sake of simplicity the elements, conductors, contacts, etc. common to Figs. 14 and 15 and to Figs. 11 to 13 are designated by like numerals.

As shown in my valve patent above referred to, the valve has an index ring 382 supported on the housing and having slots 383, 384 and 385 for defining the three positions of the valve. A handle 386 is supported for rotation on an axis transverse to the valve stem 387 to raise the handle out of the slots 383 to 385 and for unseating the stem plate by movement of the stem longitudinally upward and the handle is rotatable along the index plate between the notched positions shown for indexing the stem plate between its various positions. A switch on each of the valves designated by the numerals 388a, 388b and 388c is closed by movement of the handle 386 into the backwash position, as will presently be more fully described.

This form of the device operates in the same manner as that shown in Figs. 11 to 13, during the primary test cycle thereof and functions to produce identical results so long as the effluent water from the tanks remains soft, testing the effluent from one tank after another until the test shows the effluent to be harder than a predetermined degree. When this occurs the relay 223 will not be picked up when the lamp 134 is energized as previously explained. Therefore, when switch 229 closes, 110 volt current flows from the power line L1 through a conductor 389, switch contacts 195, conductor 194, switch contacts 189 and 229, switch blade 231, contacts 232, conductor 242, switch contacts 243, conductor 244, the coil of relay 245, conductor 246, a conductor 391, contacts 392a, 392b and 392c, a conductor 393, and conductor 394 through main switch 395 to the power line L2, causing the relay 245 to pick up, closing contacts 248. Closing of the contacts 248 completes a circuit through the primary 249 of transformer 251 by way of a circuit including conductors 254 and 253, relay blade 247, contacts 248, conductor 254, contacts 255c, 255b, 255a, conductor 256 to the rectifier, the opposite side of which is connected to the secondary of transformer 251, causing the rectifier 257 to be energized and at the same time causing the bell 301 to emit a signal. The transformer 251 is energized by way of a circuit including the power line L1, conductors 208 and 259, a conductor 396, conductor 394 and switch 395 connected to power line L2. Direct current from the rectifier is therefore supplied to the coil 265a of the relay 154a by way of a circuit including conductor 266, coil 265a, conductor 267a, contacts 268a which have been closed by action of cam 269a, conductor 271a, 164, 272, and 273. Upon energization of the relay coil 265a the movable element 274a thereof moves to its opposed position as previously described, opening contacts 153a and 255a and closing contacts 275a and 276a, the relay locking up as previously described. The lamp associated with the relay 154 will be illuminated by current through the circuit previously described. At the sound of the bell and the illumination of the lamp, the operator shifts the lever 386 of the softener valve to the back-wash position, rotating the stem plate through 180°. In this position the handle of the valve contacts the stem of the switch 388a opening contacts 392a and closing contacts 397a. Upon the opening of contacts 392a the circuit through the primary of the transformer 145 is broken, this circuit having been made by way of the power line L1, conductor 389, conductor 316, switch contacts 317, conductor 318, conductor 391, switch contacts 392a, 392b and 392c, conductors 393, 396 and 394 and the switch 395 to power line L2. This causes the testing device to be de-energized and allows the contacts 248 to open, thus shutting off the bell 301.

Closing of the contacts 397a completes the circuit through the heating coil 305 of the thermal timer 306 by way of conductors 398 and 399, secondary 401 of a transformer 402 and a conductor 403 causing the thermal timer to heat and warp the blade 308 to close contacts 309. The purpose of this timing is to time the period of back-washing, and when the contacts 309 close, circuit is closed through a bell 404 from the secondary 401 by way of conductors 405 and 406, contacts 309, blade 308, and conductor 403 causing the bell to be energized to emit a signal to the operator that the termination of the back-wash has been reached. The operator then grasps the handle 386 shifting the same to the brine intake position. Upon movement of the lever 386 the switch 388a returns to its previous position opening the contacts 397a and closing the contacts 392a, reestablishing the circuit through the transformer 145.

Upon movement of the valve to the brine intake position, reduced pressure is applied to the brine line as heretofore described, causing the valve 32 to open and supply brine in the manner described. When the required amount of brine has been supplied, the valve 32 is closed by action of the bell 37, previously described, thereby closing the supply of brine but permitting water to continue through the softener tank for the purpose of washing out the brine. Simultaneously with the movement of the softener valve to the brine intake position, the operator throws the switch control member 334 to a latched position to the left facing Fig. 15, by manual actuation of the knob 330 (Fig. 6) of telephone switch 150 causing the opening of switch contacts 237, 243 and 149 and the closing of other contacts as will appear more fully, closing the circuit through the heating coil 336 of thermal timer 337 by way of conductor 146, heating coil 336, conductor 339, switch contacts 335, and conductors 338, 236 and 159, through the secondary of the transformer 145, causing the blade 341 to be slowly heated. This timer is so arranged that the time required for the blade to close contacts 363 is sufficient to permit complete brine injection into the softener tank and to permit of a large proportion of the brine being washed out of the tank prior to the closing of contacts 363.

When contacts 363 are eventually closed by action of blade 341, operation of the testing device is initiated in the manner previously described by closing of the circuit between conductors 146 and 159, through motor 111, and the various steps of the test are conducted. If there is any substantial degree of hardness producing constituents in the sample under test, the relay 235 will not be picked up and no action will occur as a result of the test. The switch contacts 335 being closed, a second test will be initiated directly upon the termination of the first, and this repeated testing continues until the effluent water is soft and fails to materially obstruct the light passing through the cell 93. Under these circumstances relay 223 will be picked up, closing contacts 233, whereupon the relay 245 will be picked up by way of a circuit including conductor 389 connected to the power line L1, switch contacts 195, conductor 194, contacts 189 and 229, blade 231, contacts 233, conductor 407, switch contacts 408, conductor 244, coil 245, conductors 246 and 291, contacts 392a, 392b and 392c, conductors 393 and 394, and switch 395 to power line L2. Picking up of the relay 245 closes contacts 248 completing a circuit through the bell 301 in the manner previously described causing a signal to be emitted notifying the operator that the softener tank may be returned to service. The operator thereupon moves the softener valve back to the service position, moves the switch control member 334 back to the position shown in Fig. 15, thereby terminating the operation of the bell 301 and momentarily opens the main power switch 395 cutting off the supply of power to the coil 265a of the relay 154a causing the relay to return to the position shown in Fig. 14.

Upon shifting the main softener valve to the service position, the reduced pressure on the bellows 319 is removed causing the motor 344 to open the brine valve 32, whereupon water flows into the brine tank, refilling the same as heretofore described, the valve 32 being again closed in response to movement of the bell 36 to the proper level. This returns the softener mechanism to the normal service position whereupon the thermal timer 142 again takes up the duty of initiating the test of the softener tanks in succession. The operation of the device in regenerating the other softener tanks, that is, tanks B and C, is identical with the operation just described, and the circuits thereof may be followed by substituting the numerals having the letters b or c, respectively, for those found in the description having the numeral a.

Referring now to Figs. 16 and 17, the telephone switch therein shown is of a conventional type which I have found to be satisfactory in operation, this switch being indicated diagrammatically at 150 in Figs. 12 and 15. The switch includes two banks of switch supports each bank as shown in Fig. 16 including a plurality of superimposed blocks of insulation material such as "Micarta" between which are interposed the flexible metallic contact supports and conductors, the superimposed blocks being secured together by means of screws 412. In this instance the two banks are held together by an insulating block 413 forming a part of each bank. The flexible contact supports extend outwardly in parallelly disposed relation as shown in Fig. 16, the contacts being carried on the end thereof as indicated thereon. The bank shown in Fig. 16 is diagrammatically shown as the lower bank of Fig. 15 and Fig. 12, and the upper row of contacts of these figures is carried in the bank 414 shown in Fig. 17 actuated in the manner shown in Fig. 16. The central block 413 carries a screw 415 which acts to compress a spring 416 against a roller 417, the roller in the intermediate position of the switch seating between points 418 and 419 on the switch actuating member 421 corresponding to the switch actuating member 334 of Figs. 12 and 15. This switch actuating member is pivotally mounted in a frame 422 carrying a pin 423 about which the member rotates, the member being manually rotatable by the button 330 (Fig. 6). Carried on the actuating member 421 are rollers 425 and 426 which bear against the ends of spring leaves 427 and 428 to actuate the switch. Stops 429 and 431 prevent rotation of the actuating member in either direction to an extent such that the roller 417 will pass beyond the points 418 or 419 and consequently if unrestrained, the actuating member will always return to the position shown in Fig. 16. Attached to the actuating member 421, as, for example, to the roller 426, is a link 432 connecting the actuating member to the armature 340 of the coil 333, so that when the coil is energized, the armature is drawn downward rotating the actuating member 421 in a clockwise direction a degree sufficient to cause movement of the contacts as heretofore described and retaining it in this position until deenergization of the coil 333.

When the switch is used in connection with the form shown in Fig. 15 and described in connection therewith, the coil 333, the armature 340 and the link 432 are omitted, and likewise the stop 431 is omitted so that the button 330 may be moved upwardly to an extent sufficient to permit the point 418 to pass beyond the roller 417, whereupon the roller seats between the point 418 and the point 433 to latch the switch in the required position.

While I have thus described and illustrated specific embodiments of the invention, it will be understood that these are by way of illustration, and I do not wish to be limited thereto except as required by the prior art and the scope of the appended claims, in which—

I claim:

1. The combination in a water softener of a plurality of base-exchange softener units, means for testing the effluent water from said units for hardness, means for conducting effluent water from each of said units to said testing means, valve means for regulating the flow through each of said conducting means, means for actuating said valve means to provide flow from successive softener units to said testing means at spaced intervals to test the effluent of said units one after the other, and means responsive to a positive test result for interrupting the operation of said valve means and for designating the unit requiring regeneration.

2. The combination in a water softener of a plurality of base-exchange softener units, means for testing the effluent water from said units for hardness, pipes for conducting effluent water from each of said units to said testing means, a sample valve in each of said pipes, means for actuating said valves in rotation at spaced intervals to select test samples from said units in rotation, and means responsive to a positive test result on any of said samples for interrupting the operation of said last mentioned means and for designating the unit requiring regeneration.

3. The combination in a water treatment apparatus of a plurality of base exchange water treatment units each having conduits for raw water, service water, regeneration solution and waste, valve means movable to a succession of positions to control the flow therethrough through service and regeneration steps, and means for moving said valve means, means for testing the effluent water for hardness, means for supplying effluent from said softener units in rotation to said testing means for test, and means responsive to a positive test result for interrupting said tests and for designating the unit requiring regeneration, means rendered operative upon movement of the valve of one of said units to back-wash position for measuring the duration of a back-wash interval, a tank for regenerating solution, a valve in the regenerating solution pipe, means rendered operative coincidental with movement of said valve means to regenerating position for opening said regenerating solution valve to supply regenerating solution to said unit, means responsive to the level of regenerating solution in said tank for closing said regenerating solution valve to terminate the flow of solution to said unit, means rendered operative coincidental with movement of said valve means to a service position for opening said regenerating solution valve to refill said tank, and means responsive to the level of regenerating solution for reclosing said regenerating solution valve.

4. The combination in a water treatment apparatus of a plurality of base exchange water treatment units each having conduits for raw water, service water, regenerating solution and waste, valve means for each of said units means for moving said valve means to control the flow of liquid therethrough through service and regeneration steps, means for testing the effluent from said units for a property subject to change thereby, means for establishing a test connection between said units and said testing means in succession for successive tests on said units in a cycle to determine the presence or absence of said property, means responsive to a predetermined test result on the effluent from any unit for designating the unit producing said result, means for measuring a back-wash interval, a tank for regenerating solution, a pipe having a solution valve for conducting said solution to said unit through said valve means, an injector rendered operative by said valve means as it is moved to a regenerating position for drawing solution through said pipe and delivering said solution and water to said unit in a combined flow, means for opening said regenerating solution valve when said valve means occupies said regenerating position, means responsive to the level of solution in said tank for closing said regenerating solution valve to terminate the flo of said regenerating solution to said unit, to wash the unit with water flowing through said injector, and means responsive to a different test result by said testing means for indicating when said valve means should be returned to the service position thereof.

5. The combination in a water treatment apparatus of a plurality of base exchange water treatment units, each of said units having conduits for raw water, service water, regeneration solution and waste, valve means, and means for moving said valve means to control the flow of liquid therethrough through service and regeneration steps, means for periodically testing the effluent water from each of said units for a property subject to change thereby, through recurring cycles, means for interrupting said cycle of tests in response to a predetermined test result from one of said units and for designating the softener unit producing said result for regeneration of said unit, and means responsive to a different test result for indicating the return of the valve means of said unit to a service position upon completion of regeneration.

6. The combination in a water treatment apparatus of a plurality of base exchange water treatment units, each having conduits for raw water, service water, regeneration solution and waste, and valve means for controlling the flow of liquid therethrough through service and regeneration steps, means for testing the effluent water from each of said units in succession for a property subject to change thereby, and means for selectively actuating said valve means for automatically regenerating and returning to service any one of said units in response to a predetermined test result on the effluent therefrom and for resuming the cycle of test.

7. The combination in a water treatment apparatus of a plurality of base exchange water treatment units, each having conduits for raw water, service water, regeneration solution and waste, valve means for each of said units for controlling the flow of liquid therethrough through service and regeneration steps, driving means for said valves, means for periodically testing in rotation the effluent water from each of said units successively in recurring cycles for a property subject to change by said units, means responsive to a predetermined test result for interrupting said rotating cycle of test and for energizing the driving means of the unit, the effluent from which produced said predetermined test to drive said valve to a back-wash position, means for measuring a back-wash interval and for energizing said driving means to move the valve means to a regenerating position to supply regenerating solution and wash water to said unit, and means responsive to a predetermined subsequent test result by said testing means on the liquid from said unit for energizing said driving means to return said valve means to the service position.

8. The combination in a water treatment apparatus of a plurality of base exchange water treatment units each having conduits for raw water, service water, regenerating solution and waste, valve means for each of said units for controlling the flow of liquid therethrough through service and regeneration steps, means for periodically testing in rotation the effluent water from each of said units in recurring cycles, driving means for said valve means, means responsive to a predetermined test result on one of said units for interrupting said cycle of test and for energizing the driving means of the unit, the effluent from which produced said predetermined test to a back-wash position, means for measuring a back-wash interval and for energizing said driving means to move the valve means to a regenerating position, a tank for regenerating solution, means responsive to a subsequent predetermined test result by said testing means for energizing said driving means to return said valve means to the service position, and means rendered operative by said valve means as it is moved between the regenerating position and the service position for refilling the regenerating solution tank.

9. The combination in a water treatment apparatus of a plurality of base exchange water treatment units, each having conduits for raw water, service water, regenerating solution and waste, valve means for each of said units, means for moving said valve means to control the flow of liquid therethrough through service and regeneration steps, means for periodically testing in rotation the effluent water from each of said units in recurring test cycles, switch means controlled by said testing means when a test produces a predetermined test result for interrupting the test cycles and for energizing said means moving the valve means of the unit the effluent from which produced said predetermined test result to a back-wash position, means rendered operative by said valve means by movement thereof to the regenerating position for supplying regenerating solution and wash water to said unit, means rendered operative by said valve means by movement thereof for rendering said switch means responsive to said testing means when a test produces a different test result, and means for returning said valve means to the service position upon the occurrence of said different test result.

10. The combination in a water treatment apparatus of a plurality of water treatment units each having conduits for raw water, treated water, regenerating solution and waste, valve means and means for moving said valve means to control the flow therethrough to recondition said unit, testing means for testing the treated water from said units for a property subject to change thereby, means for establishing a test connection between each of said units and said tester in rotation through recurring cycles, and means for interrupting the operation of the last mentioned means in response to a predetermined test result from one of said units to maintain test connection between the unit from which said test result originated and said tester for successive subsequent tests thereon.

11. The combination in a water treatment apparatus of a plurality of base exchange water treatment units, valve means for each of said units, means for moving said valve means to control the flow of liquid therethrough through service and regeneration steps, means for testing the effluent water from said units for a property subject to change by said units, pipes for conducting effluent water from each of said units to said testing means, a sample valve in each of said pipes, means for actuating said sample valves in rotation at spaced intervals to select test samples from said units, and means responsive to a predetermined test result on a sample for interrupting the operation of said actuating means to hold said sample valve through which said test sample passed in an open position for successive tests on the effluent of a single unit.

12. The combination in a water treatment apparatus of a plurality of base exchange water treatment units, means for controlling the flow of water therethrough, means for testing the effluent water from said units for a property subject to change thereby, pipes for conducting effluent water from each of said units to said testing means, a sample valve in each of said pipes, means for actuating said sample valves in rotation at spaced intervals to select test samples from said units in rotation, and means responsive to a predetermined test result on any of said samples for interrupting the operation of said last mentioned means and for designating the unit from which the sample producing said test result originated.

13. The combination in a water treatment apparatus of a plurality of base exchange water treatment units arranged for simultaneous delivery of treated water, means for selecting specimens of the treated water from said units in rotation, means for testing said specimens for the exhaustion of one of said units, means for actuating said selecting means and said testing means in timed relation, and means responsive to a predetermined test result for indicating the unit producing said predetermined test result.

14. The combination in a device of the character described of a plurality of water treatment units for delivering treated water interconnected to form a unitary water treatment apparatus, means for conducting water to and from said treatment units, a tester for testing said water for a property subject to change by said units, means for establishing a test connection between each of said units and said tester in succession for successive tests on said units in a cycle to determine the presence or absence of said property, controllable means associated with each of said units to be energized in response to a change in said property in the water delivered therefrom, and means responsive to changes in the test results corresponding to predetermined changes in said property for energizing the controllable means associated with the unit producing said test result.

15. The combination in a water treatment apparatus of a plurality of base exchange water treatment units arranged for simultaneous delivery of treated water, means for conducting water to and from said treatment units, a tester for testing specimens of treated water for the exhaustion of said units, test responsive means associated with each of said units, means for supplying specimens of treated water from said units to said tester in rotation and for establishing control of said tester over the corresponding test responsive means, means for actuating said tester and said specimen supplying means in timed relation, and means responsive to a predetermined test result for actuating said test responsive means and for interrupting the rotation of tests to supply test specimens from a single unit for successive tests thereon.

16. The combination recited in claim 14 wherein said controllable means comprises signal means associated with each of said units.

17. The combination in a water treatment apparatus of a plurality of water treatment units each having conduits for raw water, treated water, regenerating solution and waste, valve means, and means for moving said valve means to control the flow therethrough to recondition said unit, testing means for testing the treated water from said units for a property subject to change thereby, means for establishing test connection between each of said units and said tester in rotation through recurring cycles, means for periodically energizing the last mentioned means, and means for interrupting the operation of said energizing means to terminate said test cycle and for performing another function in response to a predetermined test result from one of said units.

18. The combination in a water treatment apparatus of a plurality of water treatment units, each having conduits for raw water, treated water, regenerating solution and waste, and valve means for controlling the flow therethrough to recondition said unit, testing means for testing the treated water from said units for a property subject to change thereby, control means responsive to said testing means for moving said valves through steps of regeneration and return to service, means for establishing test connection between each of said units and said tester in rotation through recurring cycles, means for periodically energizing the last mentioned means, and means responsive to a predetermined test result from one of said units for interrupting the operation of said energizing means to terminate said test cycle and for establishing control of said control means over the valve means of the corresponding unit to effect regeneration and return to service.

19. The combination in a water treatment apparatus of a plurality of water treatment units, each having conduits for raw water, treated water, regenerating solution and waste, and valve means for controlling the flow therethrough to recondition said unit, testing means for testing the treated water from said unit for a property subject to change thereby, control means responsive to said testing means for moving said valves through steps of regeneration and return to service, means for establishing test connection between each of said units and said tester in rotation through recurring cycles, means responsive to a predetermined test result from one of said units for interrupting the operation of the last mentioned means to terminate said test cycle and for establishing control of said control means over the valve means of the corresponding unit to effect regeneration and return to service, and means for resuming operation of said last mentioned means when said unit returns to service.

20. The combination in a water treatment apparatus of a plurality of water treatment units each having conduits for raw water, treated water, regeneration solution and waste, and valve means for controlling the flow therethrough to recondition said unit, testing means for testing the treated water from said units for a property subject to change thereby, control means responsive to said testing means for controlling said valves through steps of regeneration and return to service, means for periodically establishing a test connection between separate units and said tester in rotation, and means responsive to a predetermined test result from one of said units for interrupting the operation of the last mentioned means and for establishing control of said tester over the control means of the corresponding unit to effect regeneration and return to service thereof.

21. The combination recited in claim 10 wherein means are provided for reestablishing said recurring cycle of tests in response to a different test result from said one of said units.

22. The combination in a water treatment apparatus comprising a plurality of water treatment units each having conduits for raw water, service water, regenerating solution and waste, and valve means for controlling the flow therethrough through steps of regeneration and return to service, testing means for testing the flow from said units and for moving said valve through the steps of regeneration and return to service in response to a predetermined test response on said effluent, means for connecting said testing means to said units for tests on successive units, and means for establishing control connections between said testing means and the valve means of the corresponding units.

23. The combination in a water treatment apparatus of a plurality of water treatment units, conduits for delivering treated water therefrom into a combined flow, valves for controlling the flow through said conduits, means for testing the treated water from said units for a property subject to change thereby, means for periodically establishing test connection between each of said units and said tester in rotation through recurring cycles to periodically test the treated water from each of said units, and means responsive to a test result showing a predetermined change in said property from said units for moving the valve of the unit producing said test result to terminate the flow from said unit to said combined flow.

24. The combination in a water softener of a plurality of base-exchange softener units, motor operated valve means for each of said units for controlling the flow of liquid therethrough through service and regeneration steps, means for testing the effluent water from said units for hardness, pipes for conducting effluent water from each of said units to said testing means, a sample valve in each of said pipes, means for actuating said sample valves in rotation at spaced intervals to select test samples from said units, relay means associated with each of said sample valves, and means responsive to a positive test result on a sample for actuating the relay associated with the sample valve through which said test sample passed to lock said relay and hold said sample valve in an open position for successive tests on the effluent of a single unit.

25. The combination in a water softener of a plurality of base-exchange softener units, motor operated valve means for each of said units for controlling the flow of liquid therethrough through service and regeneration steps, means for testing the effluent water from said units for hardness, pipes for conducting effluent water from each of said units to said testing means, a sample valve in each of said pipes, means for actuating said sample valves in rotation at spaced intervals to select test samples from said units, relay means associated with each of said sample valves, means responsive to a positive test result on a sample for actuating the relay associated with the sample valve through which said test sample passed to lock said relay and hold said sample valve in an open position for successive tests on the effluent of a single unit, means responsive to a negative test result on the effluent from said unit during the regeneration cycle for unlocking said relay to resume the rotating cycle of test.

26. The combination recited in claim 13 having means for energizing said motor operated valve means of said unit to drive said valve means to the next succeeding position thereof in response to said positive test result.

27. The combination recited in claim 24 having means for initiating said motor operated valve means of said unit in response to said positive test result to drive the valve means through a succession of regenerating steps, and means responsive to a negative test result on the effluent from said unit for unlocking said relay and sample valve for resumption of the rotating test cycle and for energizing said motor operated valve means to return the same to service position.

28. The combination in a water softener of a plurality of base-exchange softener units, motor operated valve means for each of said units for controlling the flow of liquid therethrough through service and regeneration steps, means for testing the effluent water from said units, pipes for conducting effluent water from each of said units to said testing means, a sample valve in each of said pipes, means for actuating said sample valves in rotation at spaced intervals to select test samples from said units, relay means associated with each of said sample valves, relay means responsive to a positive test result on a sample for actuating the relay associated with the sample valve through which said test sample passed to lock said valve relay and hold said sample valve in an open position for successive tests on the effluent of a single unit, and relay means responsive to a negative test result on the effluent from said unit during the regeneration cycle for unlocking said valve relay to resume the rotating cycle of test.

29. The combination in a base-exchange water softener of a plurality of softener units, and means for selecting test samples therefrom comprising conduits for conducting effluent from each of said units, valve means for controlling the flow through said conduits, and motor operated means for actuating said valves in rotation at spaced intervals, to select samples from said units in succession.

30. The combination in a water softener of a plurality of base-exchange softener units, valve means for each of said units for controlling the flow of liquid therethrough through service and regeneration steps, a single tank for regenerating solution connected to each of said valve means for supplying regenerating solution to each of said units during the regeneration thereof, a single testing means for testing the effluent from each of said units, means for conducting samples from said units to said testing means in rotation, and means for selectively actuating said valve means for automatically regenerating and returning to service any one of said units in response to a positive test result on the effluent therefrom.

31. The combination in a water treatment device of a plurality of base exchange water treatment units arranged for simultaneous operation, valve means for controlling the flow of liquid therethrough through service and regeneration steps, means for testing the effluent water from said units, means for conducting effluent water from each of said units to said testing means, power operated valve means for successively regulating the flow through said conducting means to test the effluent from successive units, and means responsive to a positive test result for interrupting the operation of the last mentioned valve means and for designating the unit requiring regeneration.

ARTHUR L. RICHE.

CERTIFICATE OF CORRECTION.

Patent No. 2,315,223. March 30, 1943.

ARTHUR L. RICHE.

It is hereby certified that error appears in the printed specification of the above numbered patent requiring correction as follows: Page 12, second column, line 27, claim 9, after the word "means" insert --for--; page 14, first column, line 71, claim 26, for "claim 13" read --claim 24--; and that the said Letters Patent should be read with this correction therein that the same may conform to the record of the case in the Patent Office.

Signed and sealed this 18th day of May, A. D. 1943.

(Seal)

Henry Van Arsdale,
Acting Commissioner of Patents.